(12) United States Patent
Takesue et al.

(10) Patent No.: US 10,855,877 B2
(45) Date of Patent: Dec. 1, 2020

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Naoya Takesue, Tokyo (JP); Masashi Oya, Soka (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/697,246

(22) Filed: Nov. 27, 2019

(65) Prior Publication Data

US 2020/0171820 A1 Jun. 4, 2020

(30) Foreign Application Priority Data

Dec. 3, 2018 (JP) .................................. 2018-226552
Oct. 1, 2019 (JP) .................................. 2019-181457

(51) Int. Cl.
*H04N 1/32* (2006.01)
*B41J 2/045* (2006.01)
(Continued)

(52) U.S. Cl.
CPC ........ *H04N 1/32219* (2013.01); *B41J 2/0456* (2013.01); *B41J 2/04535* (2013.01); *B41J 2/04558* (2013.01); *B41J 2/2146* (2013.01); *B41J 29/393* (2013.01); *H04N 1/4055* (2013.01); *H04N 1/4072* (2013.01); *H04N 1/4078* (2013.01); *H04N 1/605* (2013.01);
(Continued)

(58) Field of Classification Search
CPC .. H04N 1/32219; H04N 1/6036; H04N 1/605; H04N 1/4055; H04N 1/4072; H04N 1/4078; B41J 29/393; B41J 2/2146; B41J 2/0456; B41J 2/04558; B41J 2029/3935; B41J 2/2128; G06K 15/027
See application file for complete search history.

(56) References Cited

U.S. PATENT DOCUMENTS 9,462,091 B2 10/2016 Hara et al.
9,485,388 B2 11/2016 Kodama et al.
(Continued)

FOREIGN PATENT DOCUMENTS

JP 2006-224483 A 8/2006

*Primary Examiner* — Julian D Huffman
(74) *Attorney, Agent, or Firm* — Carter, DeLuca & Farrell LLP

(57) ABSTRACT

The image processing apparatus of the present invention includes: an image data acquisition unit configured to acquire image data; a generation unit configured to generate an ejection pattern of ink droplets from the image data, which are ejected for forming dots from a plurality of nozzles of an image forming apparatus; a characteristic acquisition unit configured to acquire an ejection characteristic of ink droplets of the image forming apparatus; and a pattern change processing unit configured to change the ejection pattern based on the ejection characteristic and the ejection pattern, and the pattern change processing unit repeatedly performs, in a case where a gap occurs between dots that should be formed so as to contact each other by the image forming apparatus, the ejection pattern change until the gap is eliminated.

20 Claims, 18 Drawing Sheets

(51) Int. Cl.
*H04N 1/60* (2006.01)
*H04N 1/405* (2006.01)
*H04N 1/407* (2006.01)
*B41J 2/21* (2006.01)
*B41J 29/393* (2006.01)

(52) U.S. Cl.
CPC .... *H04N 1/6036* (2013.01); *B41J 2029/3935* (2013.01)

(56) References Cited

U.S. PATENT DOCUMENTS

| | | | |
|---|---|---|---|
| 9,734,439 B2 | 8/2017 | Hara et al. | |
| 9,749,496 B2 | 8/2017 | Fujimoto et al. | |
| 10,027,848 B2 | 7/2018 | Fuse et al. | |
| 10,043,118 B2 | 8/2018 | Sumi et al. | |
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,187,553 B2 | 1/2019 | Takesue et al. | |
| 10,194,053 B2 | 1/2019 | Otani et al. | |
| 10,205,854 B2 | 2/2019 | Shimada et al. | |
| 10,356,282 B2 | 7/2019 | Ochiai et al. | |
| 2005/0017999 A1* | 1/2005 | Yoshida | G06K 15/102 347/6 |
| 2009/0244165 A1* | 10/2009 | Saita | B41J 29/393 347/19 |
| 2013/0308144 A1* | 11/2013 | Iwafuchi | H04N 1/6019 358/1.9 |
| 2014/0126000 A1* | 5/2014 | Chong | G06K 15/027 358/1.8 |
| 2017/0139363 A1 | 5/2017 | Takikawa et al. | |
| 2019/0156164 A1 | 5/2019 | Yanai et al. | |
| 2019/0255861 A1* | 8/2019 | Hauck | B41J 2/2146 |
| 2020/0074251 A1 | 3/2020 | Takesue et al. | |
| 2020/0079102 A1 | 3/2020 | Ochiai et al. | |
| 2020/0101718 A1* | 4/2020 | Furuya | H04N 1/4015 |
| 2020/0156386 A1 | 5/2020 | Otani et al. | |

* cited by examiner

| Color material color image data | Large dot size | Medium dot size | Small dot size |
|---|---|---|---|
| 0 | 0 | 0 | 0 |
| 1 | 0 | 0 | 14 |
| 2 | 0 | 0 | 28 |
| ⋮ | ⋮ | ⋮ | ⋮ |
| 254 | 150 | 20 | 0 |
| 255 | 180 | 0 | 0 |

FIG.2

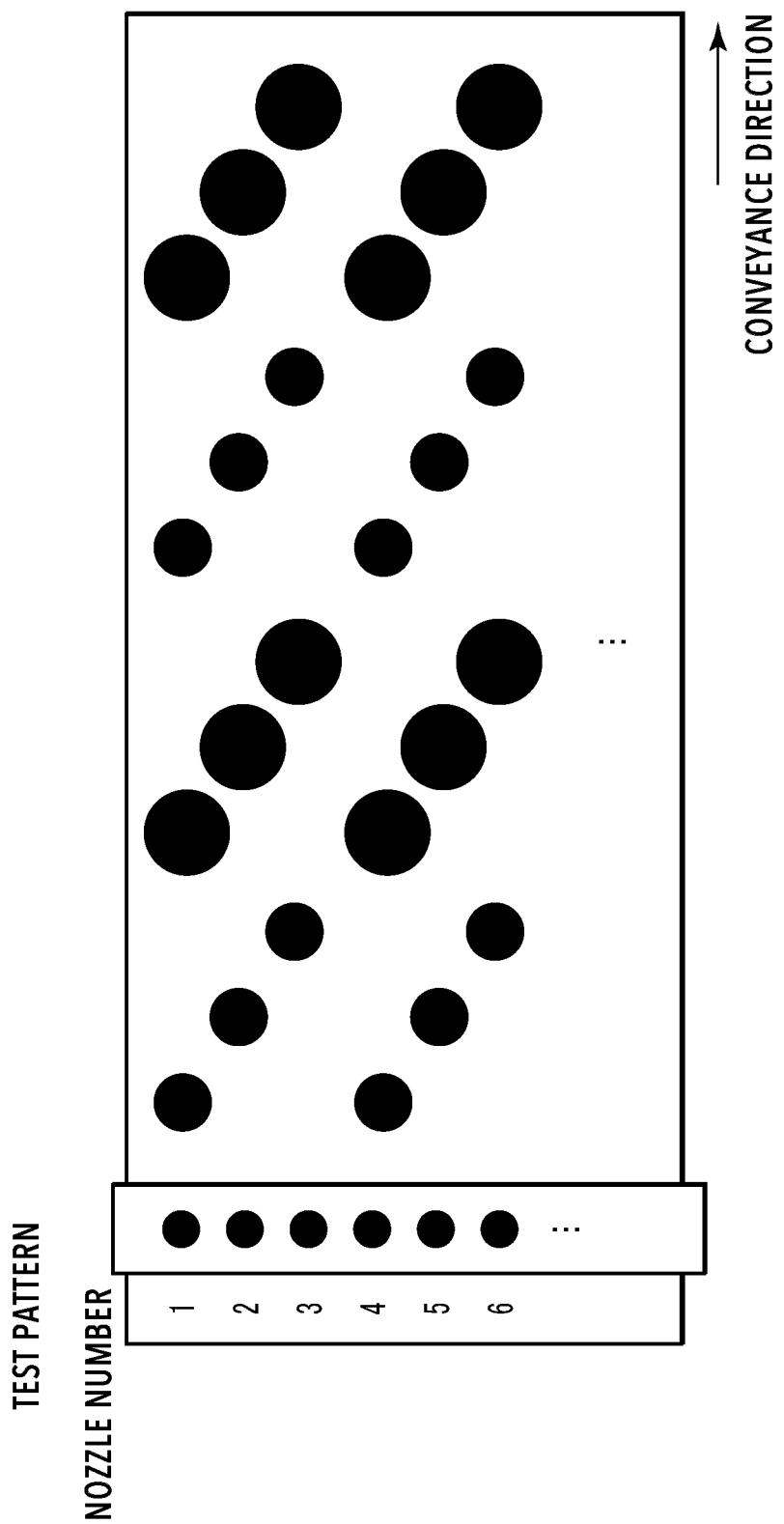

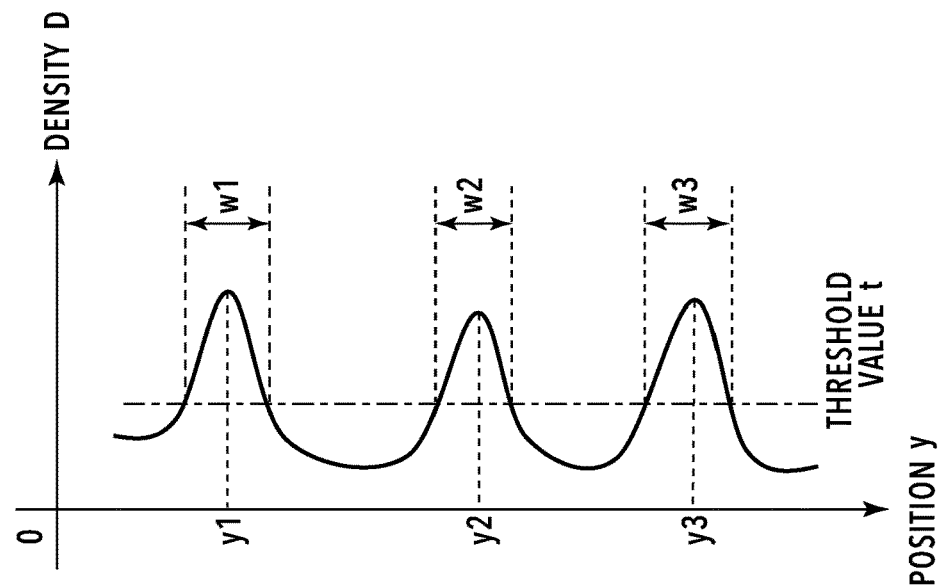

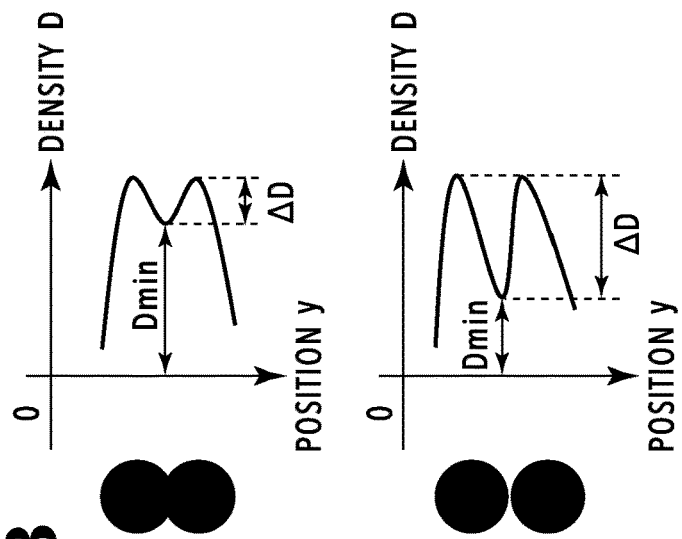

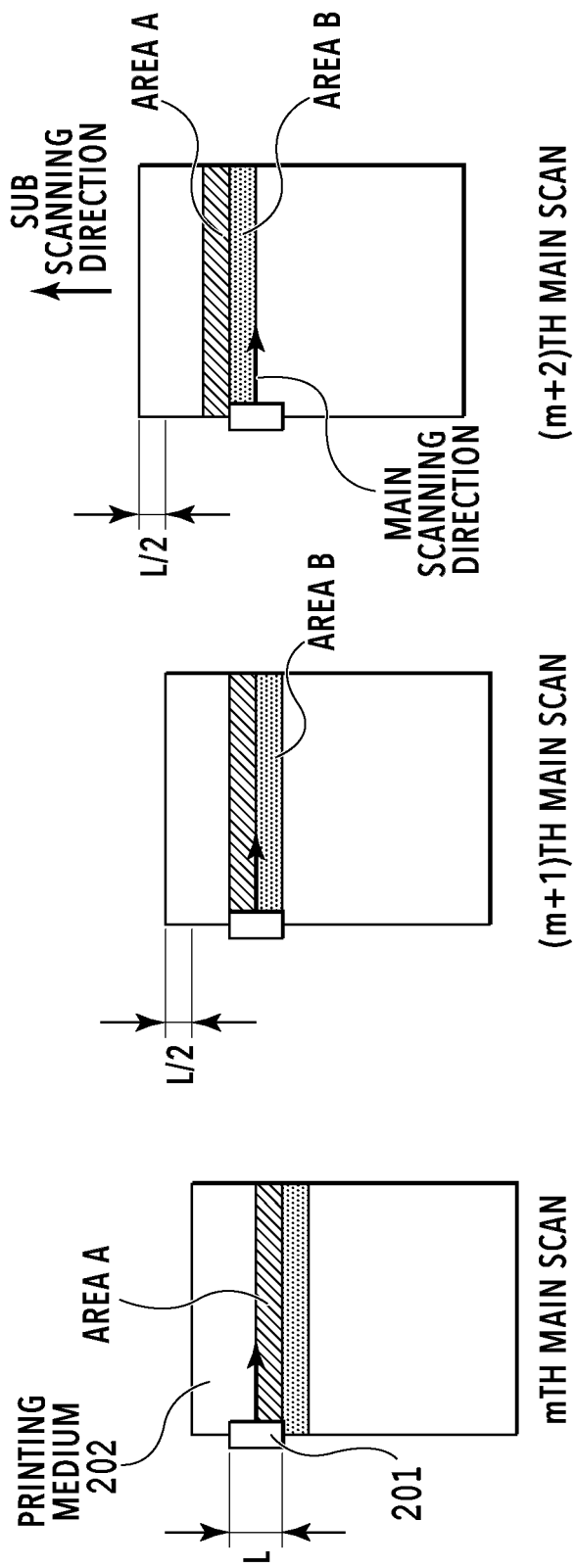

| NOZZLE NUMBER | LARGE DOT | | MEDIUM DOT | | SMALL DOT | |
|---|---|---|---|---|---|---|
| | DIAMETER | DISPLACEMENT | DIAMETER | DISPLACEMENT | DIAMETER | DISPLACEMENT |
| x | 40 | −3 | 26 | −4 | 19 | −6 |
| x+1 | 44 | +1 | 27 | +2 | 21 | +2 |

FIG.18

IMAGE PROCESSING APPARATUS, IMAGE PROCESSING METHOD AND STORAGE MEDIUM

BACKGROUND OF THE INVENTION

Field of the Invention

The present invention relates to a technique to change arrangement of dots in image data after halftone processing.

Description of the Related Art

As an apparatus that outputs an image processed by a personal computer and an image captured by a digital camera or the like, an image forming apparatus is used that forms an image by fixing dots on a printing medium. Among the image forming apparatuses as described above, a method has widely been put to practical use that forms an image on a printing medium by ejecting ink droplets from a plurality of printing elements (nozzles) and fixing the ink droplets and as a representative example thereof, an ink jet printing method is known.

However, in this ink jet printing image forming apparatus, it is difficult to completely eliminate displacements (that is, physical variations) in the ejection direction of ink from a nozzle and it is difficult to avoid the ink landing position from shifting from the target position or the ejection amount from changing. Then, the shift in ink landing position such as this may cause strip-shaped or streak-shaped density unevenness (banding) in, among others, a so-called full-line image printing apparatus.

Consequently, in order to cope with the trouble such as this, Japanese Patent Laid-Open No. 2006-224483 has disclosed a technique to suppress banding by performing rearrangement of dots based on the relative shift amount of the dot formation position of the adjacent nozzle. More specifically, in the technique disclosed in Japanese Patent Laid-Open No. 2006-224483, in a case where the dot formation positions separate more than or equal to a predetermined amount between adjacent nozzles, single correction processing (that is, processing to perform rearrangement so that large dots are located adjacent to each other) is performed for all the dots formed by both the nozzles.

However, with the technique described in Japanese Patent Laid-Open No. 2006-224483, in a case where the large dots are caused to locate adjacent to each other for all the dots formed by both the nozzles, suppression processing will be excessive depending on the dot diameter of the dot formed by each nozzle and the inter-dot distance, and therefore, there is a case where an ill effect occurs, such as worsening of granularity.

The present invention has been made in view of the conventional problem described previously and an object thereof is to appropriately reduce streak-shaped density unevenness.

SUMMARY OF THE INVENTION

In order to solve the above-described problem, the image processing apparatus of the present invention comprises: an image data acquisition unit configured to acquire image data; a generation unit configured to generate an ejection pattern of ink droplets from the image data, which are ejected for forming dots from a plurality of nozzles of an image forming apparatus; a characteristic acquisition unit configured to acquire an ejection characteristic of ink droplets of the image forming apparatus; and a pattern change processing unit configured to change the ejection pattern based on the ejection characteristic and the ejection pattern, and the pattern change processing unit repeatedly performs, in a case where a gap occurs between dots that should be formed so as to contact each other by the image forming apparatus, the ejection pattern change until the gap is eliminated.

Further features of the present invention will become apparent from the following description of exemplary embodiments with reference to the attached drawings.

BRIEF DESCRIPTION OF THE DRAWINGS

FIG. 2 is a diagram showing an example of a dot size separation LUT;

FIG. 5 is a diagram showing an example of a test pattern;

FIG. 6A is a diagram showing an example of a nozzle characteristic;

FIG. 6B is a diagram showing an example of a nozzle characteristic;

FIG. 11A is a diagram showing an example of a nozzle characteristic;

FIG. 11B is a diagram showing an example of a nozzle characteristic;

FIG. 11C is a diagram showing an example of a nozzle characteristic;

FIG. 13A is a diagram for explaining a printing operation in a serial ink jet printing apparatus;

FIG. 13B is a diagram for explaining the printing operation in the serial ink jet printing apparatus;

FIG. 13C is a diagram for explaining the printing operation in the serial ink jet printing apparatus;

FIG. 18 is a diagram showing an example of a nozzle characteristic.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, as a supplement, explanation is given by attaching the same symbol to the same configuration.

First Embodiment

In the present embodiment, based on the dot diameter of a dot formed on a printing medium and the displacement amount in the nozzle row direction, a combination of dots that do not contact is specified and the combination is changed so that the dots contact. The ink jet image forming apparatus in the present embodiment is a full-line image forming apparatus. That is, the ink jet image forming apparatus in the present embodiment comprises a print head comprising a plurality of nozzle groups having a length covering the entire area in the width direction of a printing medium and performs printing by a single scan for the image formation area on the printing medium.

(Apparatus Configuration)

Figure 1A:
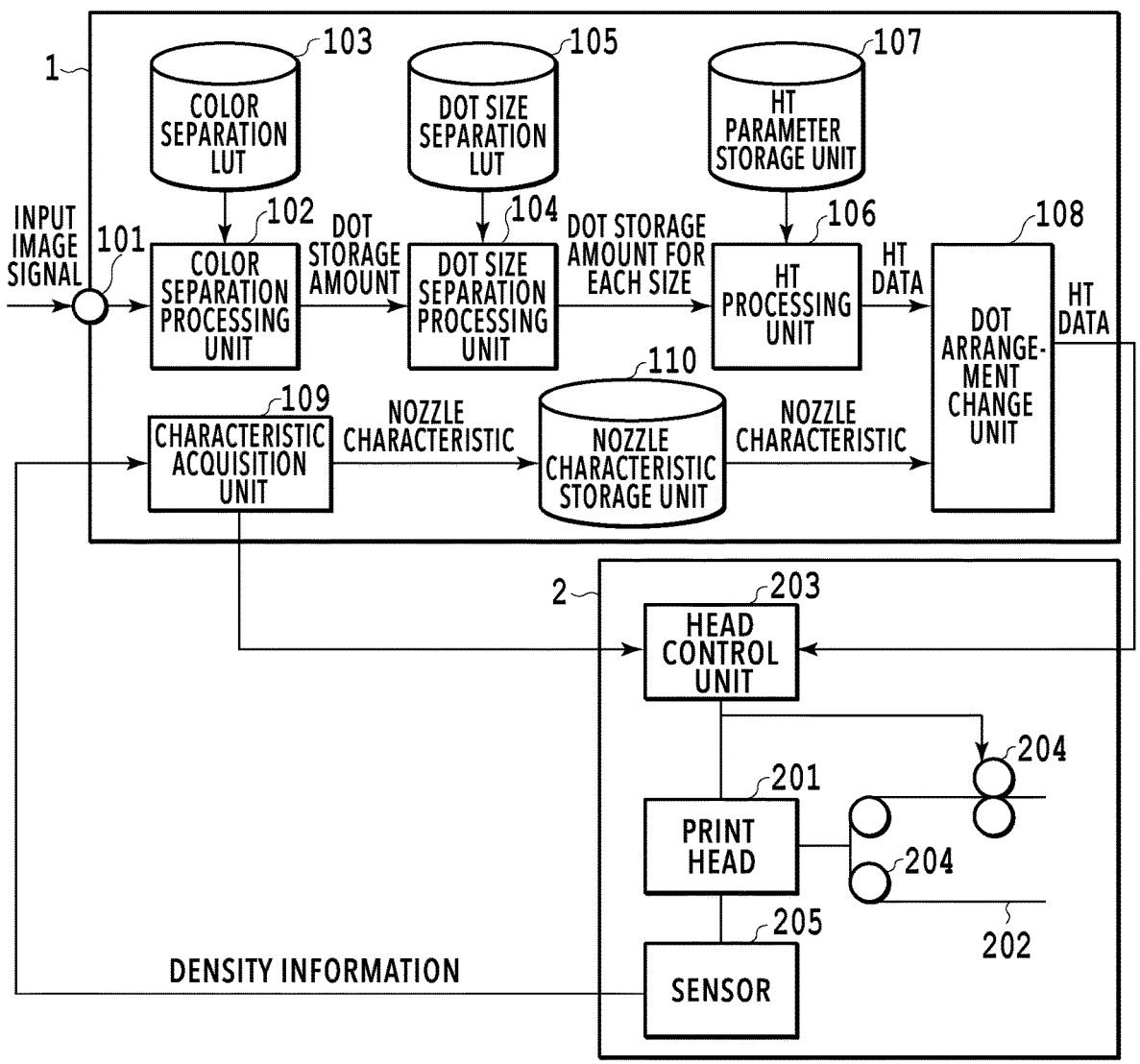
FIG. 1A is a block diagram showing a configuration of an image processing apparatus.

FIG. 1A is a block diagram showing a configuration of an image processing apparatus 1 and an image forming apparatus 2 connected to the image processing apparatus 1 according to the present embodiment. In FIG. 1A, the image processing apparatus 1 and the image forming apparatus 2 are connected by a predetermined interface or a circuit.

The image processing apparatus 1 is, for example, a general personal computer. Further, each function within the image processing apparatus 1 explained in the following is implemented by a printer driver installed in the image processing apparatus 1.

Figure 1B:
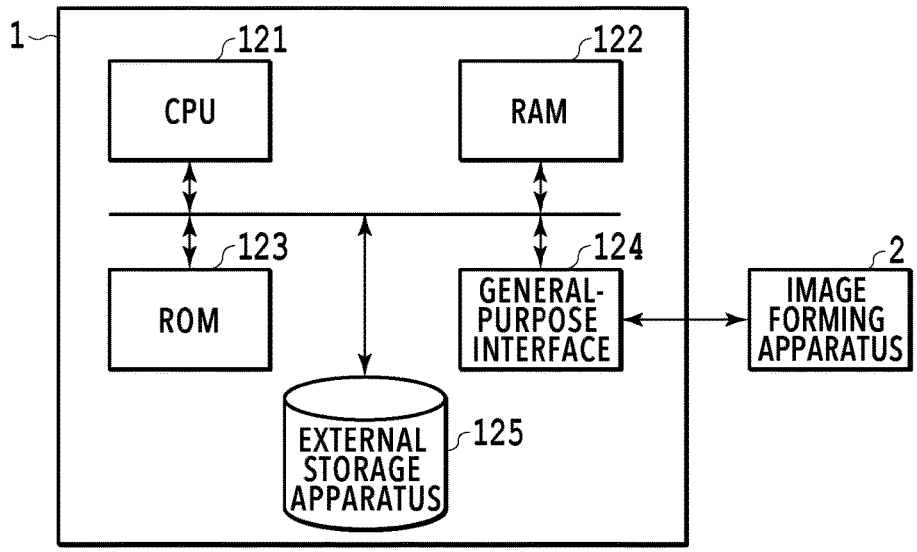
FIG. 1B is a block diagram showing a hardware configuration of an image forming apparatus.

FIG. 1B is a block diagram showing a hardware configuration of the image processing apparatus 1. The image processing apparatus 1 comprises a CPU 121, a RAM 122, a ROM 123, a general-purpose interface 124, and an external storage device 125.

The CPU (Central Processing Unit) 121 controls the operation of the entire image processing apparatus 1 by using input data and computer programs stored in the RAM 122 and the ROM 123, to be described later. Here, a case is explained as an example where the CPU 121 controls the entire image processing apparatus 1, but it may also be possible to control the entire image processing apparatus 1 by dividing the processing among a plurality of arithmetic operation processing apparatuses.

The RAM (Random Access Memory) 122 has a storage area temporarily storing computer programs and data read from the external storage device 125 and data received from the outside via the general-purpose interface 124, to be described later. Further, the RAM 122 is used as a storage area in a case where the CPU 121 performs image processing and various kinds of processing other than the image processing. In this manner, the RAM 122 appropriately provides various storage areas.

The ROM (Read Only Memory) 123 stores setting parameters by which the setting of each unit in the image processing apparatus 1 is performed, a boot program, and the like. The general-purpose interface 124 is an interface for communicating with an external apparatus (here, the image forming apparatus 2) and for example, a USB interface or the like. The external storage device 125 is a storage device storing various kinds of data used in a case where the CPU 121 performs various kinds of processing and for example, an HDD (Hard Disk Drive) or the like.

Next, by using FIG. 1A, the function configuration of the image processing apparatus 1 is explained. The image processing apparatus 1 receives printing-target color image data (hereinafter, referred to as input image data) from an input terminal 101, which is an example of an image data acquisition unit. In the present embodiment, the input image data is configured by three color components of red (R), green (G), and blue (B).

A color separation processing unit 102 separates the input image data of each color into image data (hereinafter, referred to as color material color image data) corresponding to a color material color comprised by the image forming apparatus 2. For this color separation processing, a publicly known method can be used. Consequently, for example, it is possible to separate the input image data into color material color image data by referring to a color separation lookup table (LUT) 103.

Further, in the present embodiment, the input image data of each color of RGB is separated into image data corresponding to the four kinds of color material color, that is, cyan (C), magenta (M), yellow (Y), and black (K). A configuration may be accepted in which color material color image data of CMYK is directly input at the input terminal 101 and the processing in the color separation processing unit 102 is skipped.

A dot size separation processing unit 104 separates the color material color image data acquired from the color separation processing unit 102 into image data (hereinafter, referred to as dot size image data) corresponding to each dot size. Specifically, for example, in a case where there are three kinds of dot size (large, medium, small), the color material color image data is separated into 12 kinds of dot size image data (C large, C medium, C small, M large, . . . , K small) corresponding to combinations of the color material color and the dot size. It is possible to acquire each piece of the dot size image data by referring to a dot size separation LUT 105.

FIG. 2 is a diagram showing an example of the dot size separation LUT 105. For example, in a case where the value at coordinates (x, y) of the color material color image data is "254", the value at the coordinates (x, y) of the dot size image data corresponding to the large dot size of the color material color is "150" in accordance with the LUT shown in FIG. 2. Similarly, the value at the coordinates (x, y) of the dot size image data corresponding to the medium dot size is "20" and the value at the coordinates (x, y) of the dot size image data corresponding to the small dot size is "0".

It is also possible to perform the color separation processing and the dot size separation processing at the same time. In that case, from the input image data, dot size image data separated into each dot size of each color material (CMYK) is output. Specifically, by storing and referring to the color separation and dot size separation LUT 105 in which 12 kinds of value (C large, C medium, C small, M large, . . . , K small) are stored for each of the RGB values, it is possible to perform the processing at the same time.

An HT processing unit 106 converts multi-value dot size image data in accordance with a combination of each color material and the dot size into binary image data indicating on or off of dot formation.

For the conversion processing into binary image data in the HT processing unit 106, it is possible to use a publicly known method. Consequently, for example, it is possible to convert into binary image data by storing in advance a threshold value mask in an HT parameter storage unit 107 and comparing the magnitude between the threshold value mask and the dot size image data and using the ordered dither method of determining on or off of dot formation. Alternatively, it is also possible to convert into binary image data by using the error diffusion method of diffusing an error generated by binarization of a certain pixel to the subsequent binarization-processed pixel.

A dot arrangement change unit 108 changes the binary image data output from the HT processing unit 106 based on the nozzle characteristic stored in a nozzle characteristic storage unit 110. Although details of the processing in the dot arrangement change unit 108 will be described later, specifically, the dot arrangement change unit 108 performs pattern change processing to change a pair (combination) of dots that should be formed so as to contact and which forms a gap so that the dots at least contact. Further, the processing in a characteristic acquisition unit 109 will be described later by using FIG. 6A and FIG. 6B.

In a case where the dot arrangement change processing is performed, the changed binary image data is output to the image forming apparatus 2. The image forming apparatus 2 forms an image on a printing medium 202 by ejecting each color material based on the changed binary image data received from the image processing apparatus 1 while moving the printing medium 202 relative to a print head (nozzle group) 201.

Figure 3:
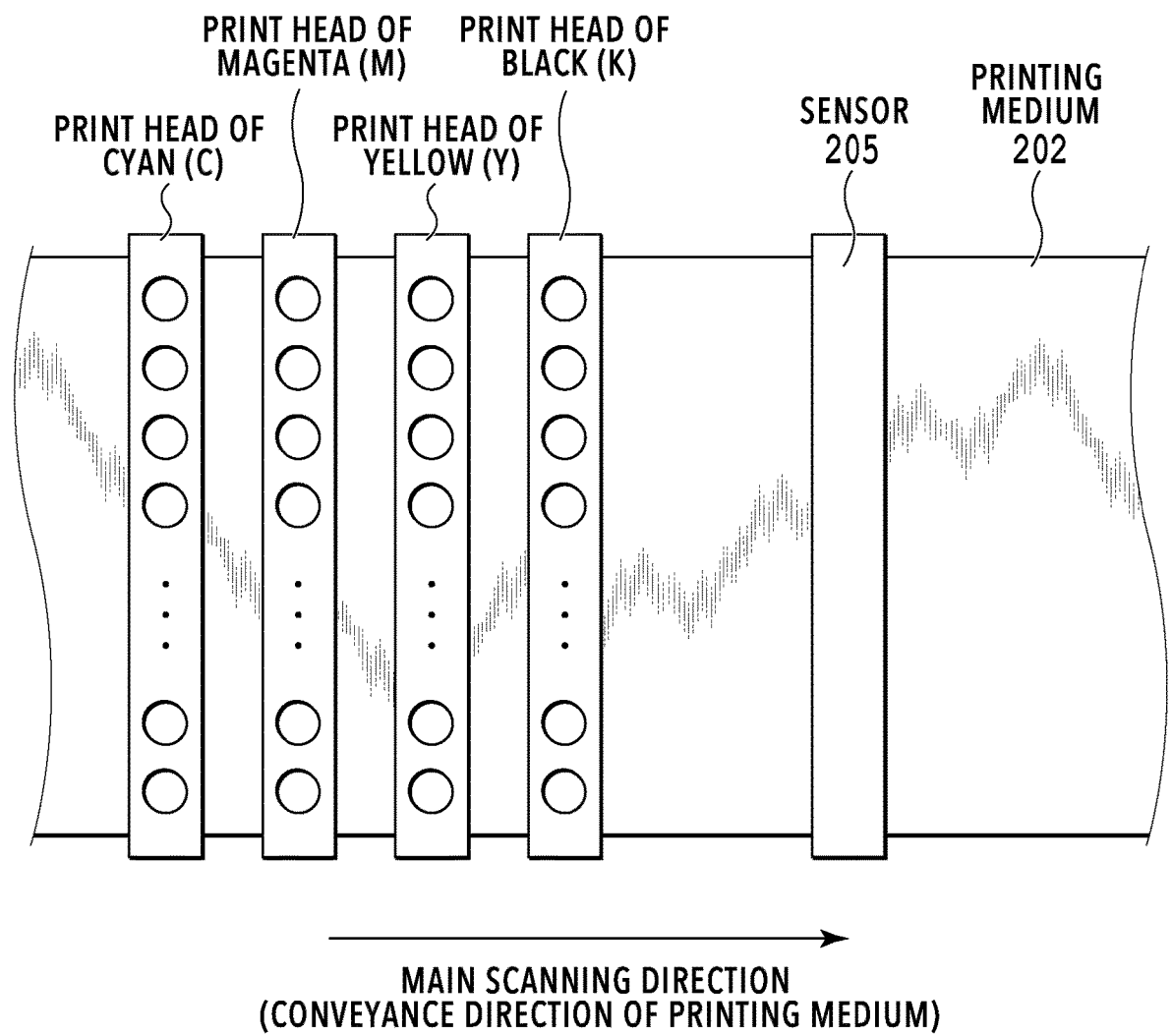
FIG. 3 is a diagram showing a configuration of a print head of a full-line ink jet printing apparatus.

In the present embodiment, as described above, it is assumed that the image forming apparatus 2 is a full-line ink jet printing apparatus. That is, the image forming apparatus 2 comprises the print head that covers the entire area in the width direction of the printing medium 202 as shown in FIG. 3 for each color material color (CMYK). Further, the print head of each color of CMYK is installed at constant distances in the main scanning direction (conveyance direction of the printing medium 202) and further, in the print head of each color of CMYK, nozzles capable of ejecting ink having the same color and the same density in a plurality of sizes (large, medium, small) are arrayed integrally. In the configuration such as this, by overlapping the image formed by each print head, a final image is formed.

A head control unit 203 generates a drive signal for controlling the print head 201 based on the changed binary image data in the process of forming the image. The print head 201 forms the image by ejecting each color material in each dot size onto the printing medium 202 based on the drive signal corresponding to each nozzle group. A conveyance unit 204 conveys the printing medium 202 at a constant speed in the main scanning direction under the control of the head control unit 203.

Further, in the present embodiment, as shown in FIG. 3, the image forming apparatus 2 comprises a line-shaped sensor 205 that covers the entire area in the width direction of the printing medium and appropriately acquires the density information on the image printed by the print head.

Further, the characteristic acquisition unit 109 acquires the ejection characteristic of each nozzle comprised by the print head 201 based on the density information acquired by the sensor 205.

As a supplement, the specific procedure until the characteristic of each nozzle is acquired (stored) is explained. First, the image forming apparatus 2 generates binary image data that is used as a test pattern by the characteristic acquisition unit 109 and forms the generated binary image data on the printing medium 202. Next, the image forming apparatus 2 acquires the density information on the test pattern formed by the sensor 205 and transmits the density information to the characteristic acquisition unit 109. Then, after that, the image forming apparatus 2 calculates the ejection characteristic of each nozzle from the density information by the characteristic acquisition unit 109 and stores the calculated density information in the nozzle characteristic storage unit 110.

The test pattern and the nozzle characteristic will be described later by using the drawings (each of FIG. 5, FIG. 6A, FIG. 6B, and the like). Further, in the above, explanation is given by assuming the configuration in which the image forming apparatus 2 comprises the sensor 205, but it may also be possible to lay out a configuration in which density information is acquired separately by using a sensor, a scanner, a microdensitometer, or the like and the density information is input to the image processing apparatus 1.

Figure 4:
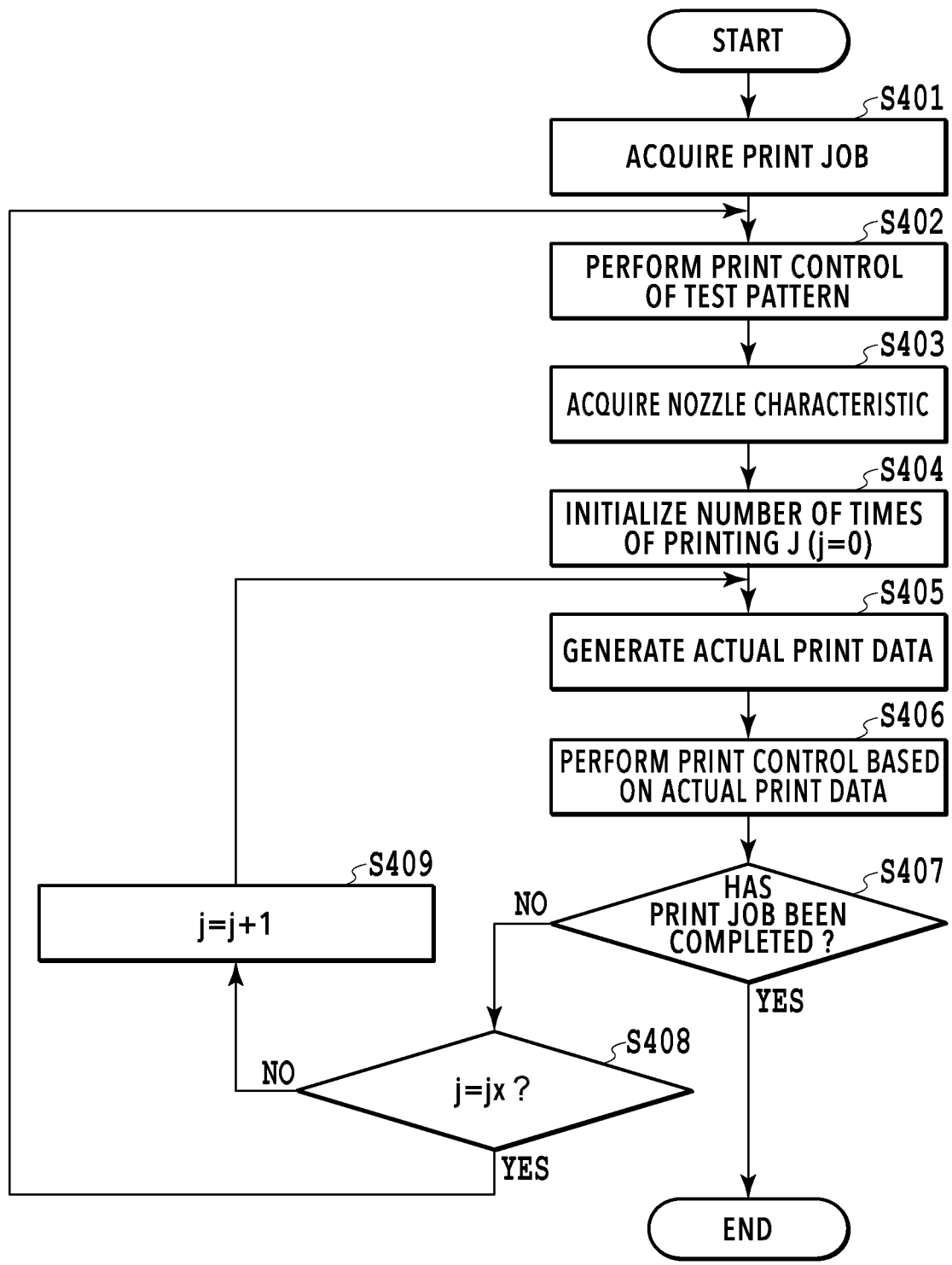
FIG. 4 is a flowchart showing a procedure of print processing in the image processing apparatus.

Next, by using the flowchart in FIG. 4, the procedure of the print processing in the image processing apparatus 1 according to the present embodiment is explained. It is assumed that symbol "S" in explanation of the flowchart represents a step. This is also true with explanation of subsequent flowcharts.

At S401, the image processing apparatus 1 acquires a print job. Specifically, the image processing apparatus 1 acquires one or more pieces of input image data and the number of copies to be printed of each image. At S402, the image processing apparatus 1 generates binary image data that is used as a test pattern by the characteristic acquisition unit 109 and further performs control so that the generated test pattern is output by the print head 201 of the image forming apparatus 2.

Here, an example of the test pattern is shown in FIG. 5. By printing the test pattern as shown in FIG. 5, the image forming apparatus 2 forms dots of different sizes on a printing medium so that the dots are sufficiently separate from another dot.

At S403, the characteristic acquisition unit 109 acquires the ejection characteristic of each nozzle by the sensor 205. That is, the characteristic acquisition unit 109 acquires the characteristic that does not receive interference from another nozzle for each nozzle by measuring the dots formed on the printing medium as the test pattern by a sensor.

Here, an example of the nozzle characteristic is shown in FIG. 6A and FIG. 6B. As the nozzle characteristic, as shown in FIG. 6A, for each nozzle, the dot diameter of each dot (width of dot) and the displacement amount (shift amount) in the direction perpendicular to the conveyance direction of the printing medium 202 are acquired and stored in the nozzle characteristic storage unit 110 in association with the nozzle number and the dot size.

For example, in the table shown in FIG. 6A, it is indicated that with the nozzle whose nozzle number is "1", in a case where the large dot is ejected, a dot whose diameter is 60 μm is formed on the printing medium 202 and the centroid of the dot shifts by −3 μm from the target position.

In FIG. 6A, the conveyance direction of the printing medium 202 in FIG. 5 is set to a positive x-direction and the downward direction in the paper width direction is set to a positive y-direction. Further, the dot diameter and the centroid on the printing medium 202 are calculated from density information acquired by the sensor 205. Here, in a case where the sensor 205 is assumed to be a line sensor, an example of density information D (y) acquired at a position y is shown in FIG. 6B.

As shown in FIG. 6B, by using a threshold value t, a width w (w1, w2, w3) to which ink sticks is estimated. Further, from the second derivative of the density, a local maximum y (y1, y2, y3) is specified. Specifically, at each predetermined interval in the x-direction (each time the printing medium 202 is conveyed by a predetermined distance), the width w to which ink sticks and the local maximum y are acquired and the maximum value of the width w to which ink sticks is stored as the dot diameter of the corresponding nozzle number. Further, the local maximum y in a case where the width w to which ink sticks takes the maximum is stored as the displacement amount. For example, in a case of the nozzle whose nozzle number is "1", the width w1 to which ink sticks and the local maximum y1 are acquired and the maximum value of the width w1 to which ink sticks is stored as the dot diameter and the local maximum y1 in a case where the width w1 to which ink sticks takes the maximum is stored as the displacement amount.

In the present embodiment, compared to the displacement amount in the nozzle row direction, contribution of the displacement amount in the conveyance direction to the streak-shaped density unevenness is small, and therefore, only the displacement amount in the direction perpendicular to the conveyance direction is stored. However, in order to reduce the streak-shaped density unevenness more accurately, it may also be possible to store also the displacement amount in the conveyance direction although the memory amount increases.

Further, there is a case where the displacement amount and the dot diameter change between a state where dots begin to be printed and a state where ink is ejected sufficiently. In such a case, it may also be possible to store the displacement amount and the dot diameter as a function for the ejection state (in a case where the input image is constant, a function in which a position x in the conveyance direction can be substituted).

Returning to FIG. 4, in a case of acquiring the ejection characteristic of each nozzle, the characteristic acquisition unit 109 initializes a number of times of printing j at S404. Specifically, the characteristic acquisition unit 109 substitutes "0" for the number of times of printing j (that is, j=0 is set). At S405, the image processing apparatus 1 generates actual print data for forming the input image data on the printing medium 202 by the image forming apparatus 2.

Specifically, the image processing apparatus 1 acquires binary image data by processing the input image data by the color separation processing unit 102, the dot size separation processing unit 104, and the HT processing unit 106. Further, the image processing apparatus 1 modifies the binary image data based on the nozzle characteristic acquired at S403 by the dot arrangement change unit 108.

At S406, the image processing apparatus 1 performs control so as to perform printing on the printing medium 202 based on the actual print data generated at S405 by the image forming apparatus 2. At S407, the image processing apparatus 1 determines whether or not all the print jobs acquired at S401 have already been printed (whether or not the print jobs have been completed).

In a case of determining that all the acquired print jobs have already been printed (Yes at S407), the image processing apparatus 1 terminates the print processing shown in FIG. 4. Further, in a case of determining that all the acquired print jobs have not been printed yet (No at S407), the image processing apparatus 1 causes the processing to advance to S408.

At S408, the image processing apparatus 1 determines whether or not the number of times of printing j is equal to a predetermined number of times jx set in advance. The predetermined number of times jx is a parameter that controls the frequency with which the nozzle characteristic is acquired. As the predetermined number of times jx, for example, print processing is performed continuously in advance in the image forming apparatus 2 and the number of times of printing until it is determined that the nozzle characteristic has changed is set. As a supplement, it is possible to determine whether or not the nozzle characteristic has changed by, for example, determining whether or not the displacement amount or the dot diameter has change by 10% or more compared to that in a case where the number of times of printing is zero.

In a case of determining that the number of times of printing j is equal to the predetermined number of times jx (Yes at S408), the image processing apparatus 1 causes the processing to return to S402 and performs control again so as to print (output) the test pattern and reacquires the characteristic of each nozzle.

In this manner, by reacquiring the nozzle characteristic each time print processing is performed the number of times the change in the nozzle characteristic is expected, in a case where the nozzle characteristic changes dynamically, it is possible to perform dot rearrangement processing (processing to change dot arrangement) so as to follow the change.

Further, in a case of determining that the number of times of printing j is not equal to the predetermined number of times jx at S408 (No at S408), the image processing apparatus 1 causes the processing to return to S405 after updating the number of times of printing j at S409 and performs the print processing of the actual print data continuously. In the present embodiment, as updating of the number of times of printing j, "1" is added to the number of times of printing j.

In a case where a plurality of the same images is printed, by storing the actual print data generated in the immediately previous processing loop in place of generating the actual print data again, it is possible to skip S405 and cause the processing to advance to S406.

Further, for example, in a case where as the print head 201, a method of ejecting ink droplets by heating the ink by a heater to bubble the ink is adopted, on a condition that printing is performed continuously, there is a possibility that the temperature inside the print head 201 rises and the nozzle characteristic changes. In such a case, it may also be possible to set a continuous print time and acquire the nozzle characteristic after printing continues for a predetermined time from acquisition of the nozzle characteristic in place of acquiring the nozzle characteristic each time the number of times of printing is performed (that is, it may also be possible to acquire the nozzle characteristic each time a print time elapses).

(Dot Arrangement Change Processing)

Figure 7B:
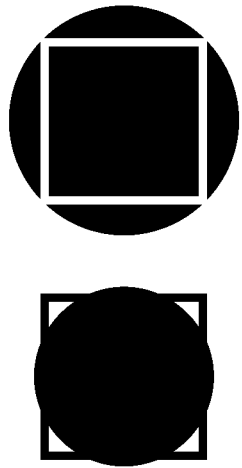
FIG. 7B is a diagram for explaining processing in the dot arrangement change unit of the image processing apparatus.
Figure 7D:
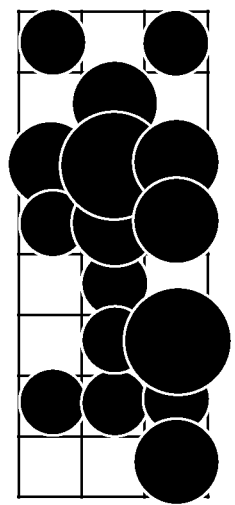
FIG. 7D is a diagram for explaining processing in the dot arrangement change unit of the image processing apparatus.
Figure 7A:
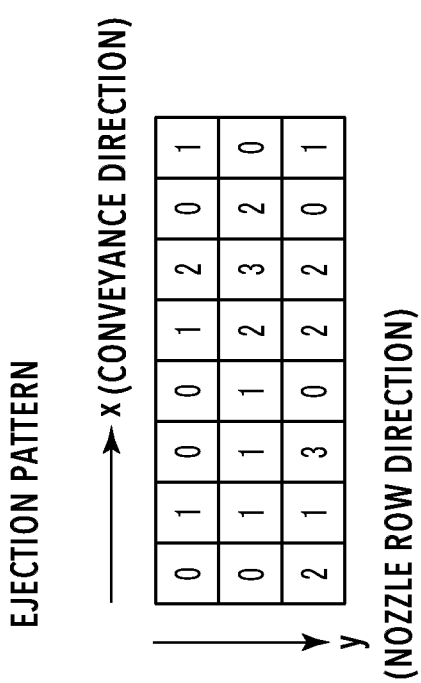
FIG. 7A is a diagram for explaining processing in a dot arrangement change unit of the image processing apparatus.

Next, by using FIG. 7A to FIG. 7D, the processing in the dot arrangement change unit 108 of the image processing apparatus 1 according to the present embodiment is explained. FIG. 7A is an example of an ejection pattern acquired by the HT processing unit 106. In the ejection pattern shown in FIG. 7A, the grid in which "0" is written indicates that no dot is ejected. Further, similarly, the grid in which "1" is written indicates that the small dot is ejected, the grid in which "2" is written indicates that the medium dot is ejected, and the grid in which "3" is written indicates that the large dot is ejected, respectively.

In the present embodiment, as shown in the left diagram in FIG. 7B, as for the small dot, it is desirable that the diameter thereof be larger than at least the height or width of the grid partitioned by the output resolution. Further, as shown in the right diagram in FIG. 7B, it is desirable that the small dot be a dot sufficient to fill in the diagonal of the grid partitioned by the output resolution.

Figure 7C:
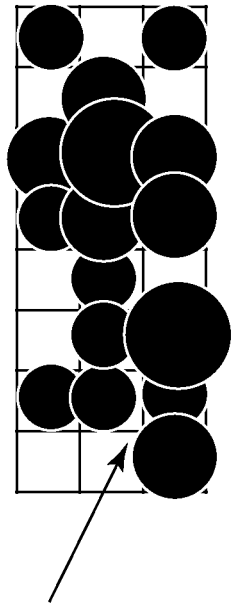
FIG. 7C is a diagram for explaining processing in the dot arrangement change unit of the image processing apparatus.

FIG. 7C is a diagram schematically showing a pattern of dots (dot pattern) formed on the printing medium 202 in a case where printing is performed in accordance with the ejection pattern shown in FIG. 7A. In a case where a layout is made so that the diameter is larger than at least the height or width of the grid partitioned by the output resolution, a streak becomes less perceptible between dots because the upper and lower dots contact as shown in FIG. 7C.

However, as described above, in a case where ink is ejected from a nozzle, it is difficult to eliminate all the displacements (that is, physical variations) in the ejection direction thereof and it is difficult to avoid the ink landing position from shifting from the target position or the ejection amount from changing. Because of this, the centroid of the dot on the printing medium 202 is displaced due to the nozzle characteristic or the like or the ejection diameter of the dot becomes small. In such a case, there is a possibility that a gap occurs between dots as shown in FIG. 7D. Further, in a case where such many gaps between dots occur between the same nozzles, those gaps are visually recognized as streak unevenness on printed matter.

Consequently, in the present embodiment, from the nozzle characteristic shown in FIG. 6A and FIG. 6B and the ejection pattern shown in FIG. 7A, the position at which a gap occurs between dots as shown in FIG. 7D is specified and by changing the combination of the dots on both sides of the gap so that no gap occurs, the streak unevenness is suppressed. That is, by changing the combination into a combination so that dots contact each other, the streak unevenness is suppressed.

In the present embodiment, as for each color of CMYK, it is assumed that the above-described suppressing processing is performed independently. That is, by suppressing binding in a case where each color ink is ejected alone, the banding of the final image obtained by overlapping images is also suppressed.

Figure 8:
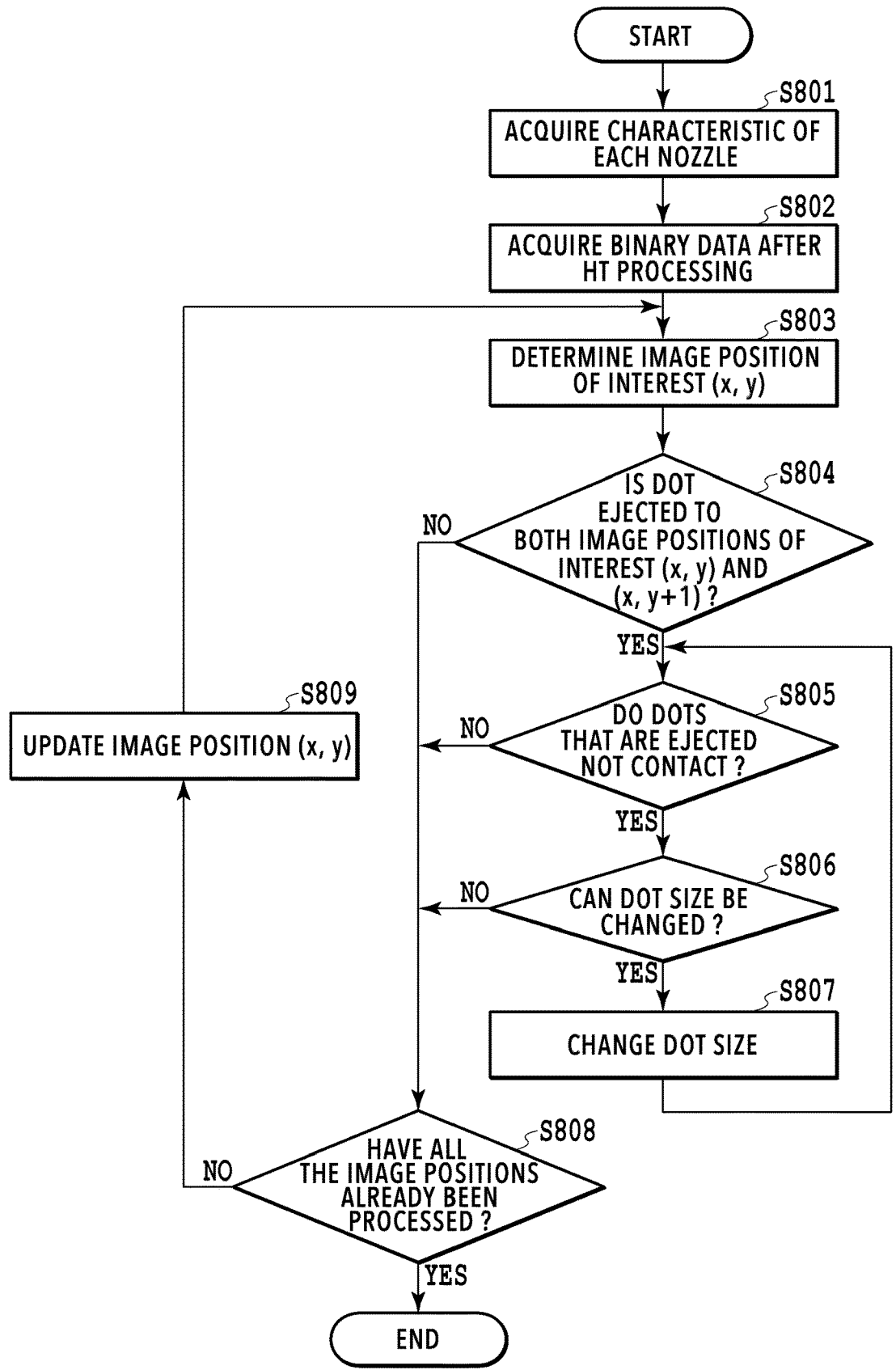
FIG. 8 is a diagram for explaining a procedure of processing and contents of the processing in the dot arrangement change unit of the image processing apparatus.

Next, by using the flowchart in FIG. 8, the procedure of the processing and the contents of the processing in the dot arrangement change unit 108 of the image processing apparatus 1 according to the present embodiment are explained. At S801, the dot arrangement change unit 108 acquires the characteristic of each nozzle stored in advance in the nozzle characteristic storage unit 110. That is, the dot arrangement change unit 108 acquires the characteristic as information capable of specifying the dot diameter and the displacement amount in a case where dots are printed by each nozzle. In the present embodiment, the table shown in FIG. 6A is acquired by the nozzle characteristic storage unit 110.

At S802, the dot arrangement change unit 108 acquires binary data after halftone processing (HT processing), which is output from the HT processing unit 106. For example, the dot arrangement change unit 108 acquires binary image data to which the presence/absence of dot ejection is set for each dot size. That is, the dot arrangement change unit 108 acquires two-dimensional data in which "1" is stored (set) in the grid that ejects a dot and "0" is stored (set) in the grid that ejects no dot. Further, it may also be possible to acquire image data to which the dot size of a dot to be ejected is set for each grid as shown in FIG. 7A.

At S803, the dot arrangement change unit 108 determines an image position of interest (x, y) that is the target of the dot rearrangement processing. At S804, the dot arrangement change unit 108 determines whether or not to eject a dot to both the image position of interest (x, y) and an image position of interest (x, y+1).

In a case of determining to eject (arrange) a dot to both the image positions of interest (x, y) and (x, y+1) (Yes at S804), the dot arrangement change unit 108 causes the processing to advance to S805. On the other hand, in a case of determining not to eject a dot to one of the image positions of interest (x, y) and (x, y+1) (No at S804), the dot arrangement change unit 108 causes the processing to advance to S808.

At S805, the dot arrangement change unit 108 determines whether or not the dots ejected to the image positions of interest (x, y) and (x, y+1) contact. Then, in a case of determining that the dots contact (Yes at S805), the dot arrangement change unit 108 causes the processing to advance to S806 and in a case of determining that the dots do not contact (No at S805), the dot arrangement change unit 108 causes the processing to advance to S808.

Figure 9C:
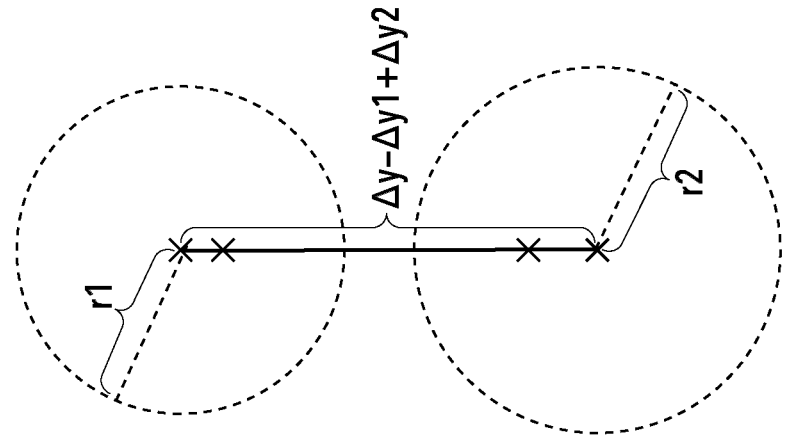
FIG. 9C is a diagram for explaining processing to determine whether or not dots contact.
Figure 9B:
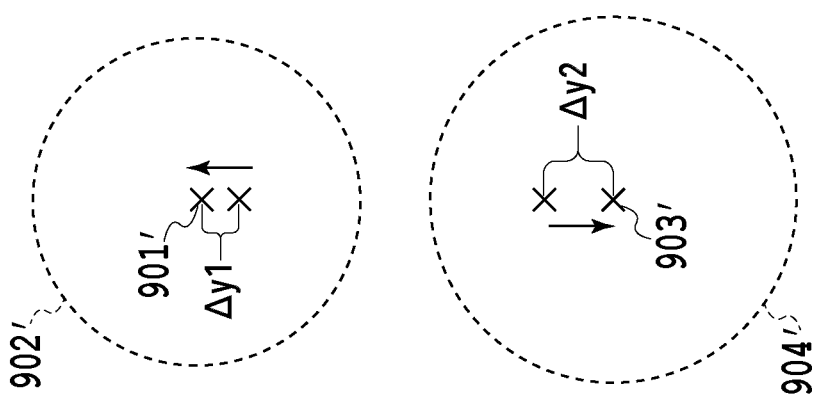
FIG. 9B is a diagram for explaining processing to determine whether or not dots contact.
Figure 9A:
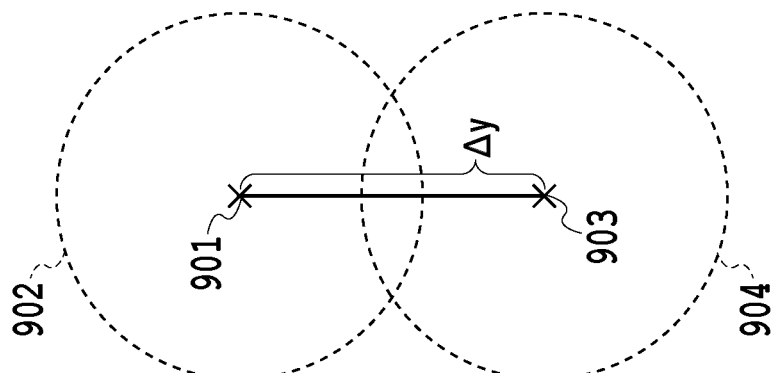
FIG. 9A is a diagram for explaining processing to determine whether or not dots contact.

Here, by using FIG. 9A to FIG. 9C, the processing to determine whether or not dots contact is explained supplementally. In FIG. 9A, symbol 901 indicates an ejection target position of the nozzle whose nozzle number is "X". Similarly, in FIG. 9A, symbol 903 indicates an ejection target position of the nozzle (nozzle number "X+1") adjacent to the nozzle whose nozzle number is "X". Then, at this time, in a case where the print resolution in the nozzle row direction is 600 dpi, it is possible to calculate a distance $\Delta y$ between the ejection target positions 901 and 903 as 25.4/600=0.042 [mm].

Symbol 902 indicates a range to which ink is predicted to stick in a case where the small dot having an average dot diameter is ejected to the ejection target position 901 by the nozzle whose nozzle number is "X". Similarly, symbol 904 indicates a range to which ink is predicted to stick in a case where the small dot having the average dot diameter is ejected to the ejection target position 903 by the nozzle whose nozzle number is "X+1".

In FIG. 9B, symbol 901' indicates the ink landing position in a case where a displacement amount $\Delta y1$ in the y-direction of the nozzle whose nozzle number is "X", which is acquired at S801 in FIG. 8 described above, is taken into consideration. Similarly, symbol 903' indicates the ink landing position in a case where a displacement amount $\Delta y2$ in the y-direction of the nozzle whose nozzle number is "X+1" is taken into consideration.

Further, in FIG. 9B, symbol 902' indicates a range by a dotted line, to which ink is predicted to stick by taking into consideration the dot diameter in a case where the small dot having the average dot diameter is ejected by the nozzle whose nozzle number is "X". Similarly, symbol 904' indicates a range by a dotted line, to which ink is predicted to stick by taking into consideration the dot diameter in a case where the small dot having the average dot diameter is ejected by the nozzle whose nozzle number is "X+1".

At this time, as shown in FIG. 9C, it is possible to determine whether or not the dot ejected by the nozzle whose nozzle number is "X" and the dot ejected by the nozzle whose nozzle number is "X+1" contact by determining whether or not $r1+r2 \geq \Delta y - \Delta y1 + \Delta y2$ is satisfied. That is, in a case where the sum of the dot radius r1 and the dot radius r2 is larger than the distance $\Delta y - \Delta y1 + \Delta y2$ between the centroids of the dot ejected by the nozzle whose nozzle number is "X" and the dot ejected by the nozzle whose nozzle number is "X+1", it is possible to determine that the dots contact.

In FIG. 9A to FIG. 9C, the example is described in which determination is performed by approximating the dot to a true circle, but with the high conveyance velocity, there is a case where the dot shape is distorted into a shape elongated in the conveyance direction, and in the case such as this, it may also be possible to approximate the dot to another shape, such as an ellipse and an oval.

Returning to FIG. 8, at S806, the dot arrangement change unit 108 determines whether or not it is possible to change the dot size of the dot that is ejected to the image positions of interest (x, y) and (x, y+1) to a larger size. Specifically, in a case where each nozzle can eject three kinds of dot, that is, the large, medium, and small dots, the dot arrangement change unit 108 determines whether or not both the dot sizes of the dots ejected to the image positions of interest (x, y) and (x, y+1) are that of the large dot.

In a case of determining that both the dots ejected to the image positions of interest (x, y) and (x, y+1) are the large dots (that is, it is not possible to change the dot size of the dot to a larger size) (No at S806), the dot arrangement change unit 108 causes the processing to advance to S808. On the other hand, in a case of determining that one of the dots ejected to the image positions of interest (x, y) and (x, y+1) is not the large dot (that is, it is possible to change the dot size of the dot to a larger size) (Yes at S806), the dot arrangement change unit 108 causes the processing to advance to S807.

At S807, the dot arrangement change unit 108 changes the dot size of the dot stepwise, which is ejected to the image position of interest (x, y) or (x, y+1), to a larger dot size. Specifically, in a case where the dot sizes of the dots ejected to the image positions of interest (x, y) and (x, y+1) are different, the dot arrangement change unit 108 preferentially selects the smaller dot of the dots that are ejected and changes the dot to the dot one size larger. For example, in a case where the medium dot is ejected to the image position of interest (x, y) and the small dot is ejected to the image position of interest (x, y+1), the dot that is ejected to (x, y+1) is changed to the medium dot.

Further, in a case where the dot size of the dots ejected to the image positions of interest (x, y) and (x, y+1) is the same, the dot that is ejected to the image position of interest (x, y) is changed to the dot one size larger. For example, in a case where the medium dot is ejected to the image position of interest (x, y) and the medium dot is ejected to the image position of interest (x, y+1), the dot ejected to the image position of interest (x, y) is changed to the large dot.

After changing the dot size at S807, the dot arrangement change unit 108 causes the processing to return to S805 and determines whether or not the dots contact in the combination of the dots whose dot size is changed at S807. Further, after causing the processing to advance to S808, the dot arrangement change unit 108 determines whether or not the processing has been performed for all the image positions as the image position of interest. In a case of determining that there is an image position for which the processing has not been performed yet (No at S808), the dot arrangement change unit 108 causes the processing to advance to S809 and updates the image position (x, y) and sets the image position to the image position for which the processing has not been performed yet.

As explained above, on the premise that an ill effect, such as worsening of granularity, is suppressed by minimizing the change in the dot size of the dots that form a combination, which are ejected from each of the adjacent nozzles, it is possible to suppress the streak-shaped density unevenness from being visually recognized. In the following, explanation about this is supplemented. In a case where increasing the dot size of one of the dots that form a combination causes the dots of the combination to contact, it is also possible to discuss to uniformly increase the dot sizes of both the dots that form the combination as single correction processing. However, in a case where the dot sizes of both the dots that form the combination are increased uniformly as the single correction processing, the possibility becomes strong that a black streak occurs due to worsening of granularity or excessive correction. Consequently, the change is minimized (made as small as possible) in a case where the dot size of the dots that form a combination is changed.

In the present embodiment, explanation is given as follows. The test pattern is printed and the characteristic of each nozzle is acquired based on the information obtained by measuring the printed results and further, in accordance with the nozzle characteristic, a predetermined number of pieces of actual pint data is printed as shown in the flowchart in FIG. 4.

However, it may also be possible to acquire the nozzle characteristic each time the actual print data is printed by providing a calibration area in the corner of the actual print data and printing the test pattern in the calibration area. As described above, by acquiring the nozzle characteristic each time the actual print data is printed, it is no longer necessary to print the test pattern and it is possible to perform the dot arrangement change processing in the (t+1)th printing based on the nozzle characteristic acquired by the tth printing of the actual print data.

Further, it is also possible to convert the test pattern into a two-dimensional image by using a scanner or the like without using the sensor 205 (line sensor) and use the dot diameter and the centroid from the two-dimensional image by applying a publicly known Hough transform or the like. In addition, in the above, the displacement amount of the ink landing position is calculated as an absolute value, but it is also possible to determine whether or not the dots contact by storing the relative value from the adjacent dot.

Second Embodiment

In the above-described first embodiment, explanation is given on the assumption that the dot diameter and the displacement amount independent for each nozzle are acquired as the nozzle characteristic and based on the nozzle characteristic, the contact state between dots is determined. Because of this, in the first embodiment, the dot diameter and the displacement amount are stored for all the combinations of the nozzles and the dots (large dot, medium dot, small dot) and in relation to this, it is necessary to increase the memory capacity for storage. In particular, in a case where the displacement amount in the conveyance direction is stored, not only that in the nozzle row direction, or in a case where the dot diameter and the displacement amount are stored as a function for the ejection state, it is surely necessary to increase the memory capacity.

Consequently, in the present embodiment, as the test pattern, the combinations of all the dots in the adjacent nozzles are printed in advance. Then, from the printed results, the pattern that causes a gap to occur is extracted and stored, and thus, the streak unevenness is suppressed.

Figure 10A:
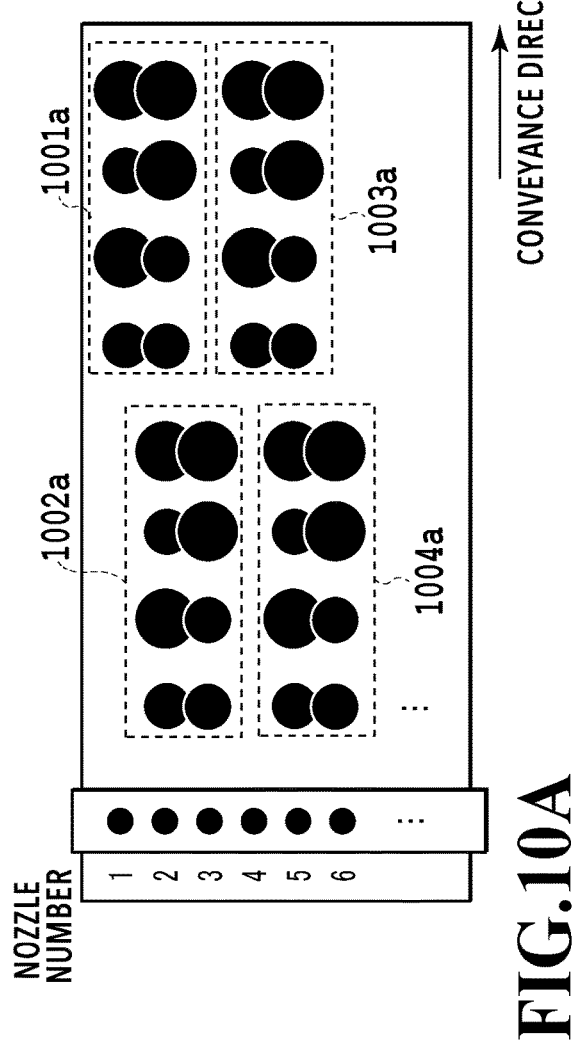
FIG. 10A is a diagram showing an example of a test pattern.
Figure 10B:
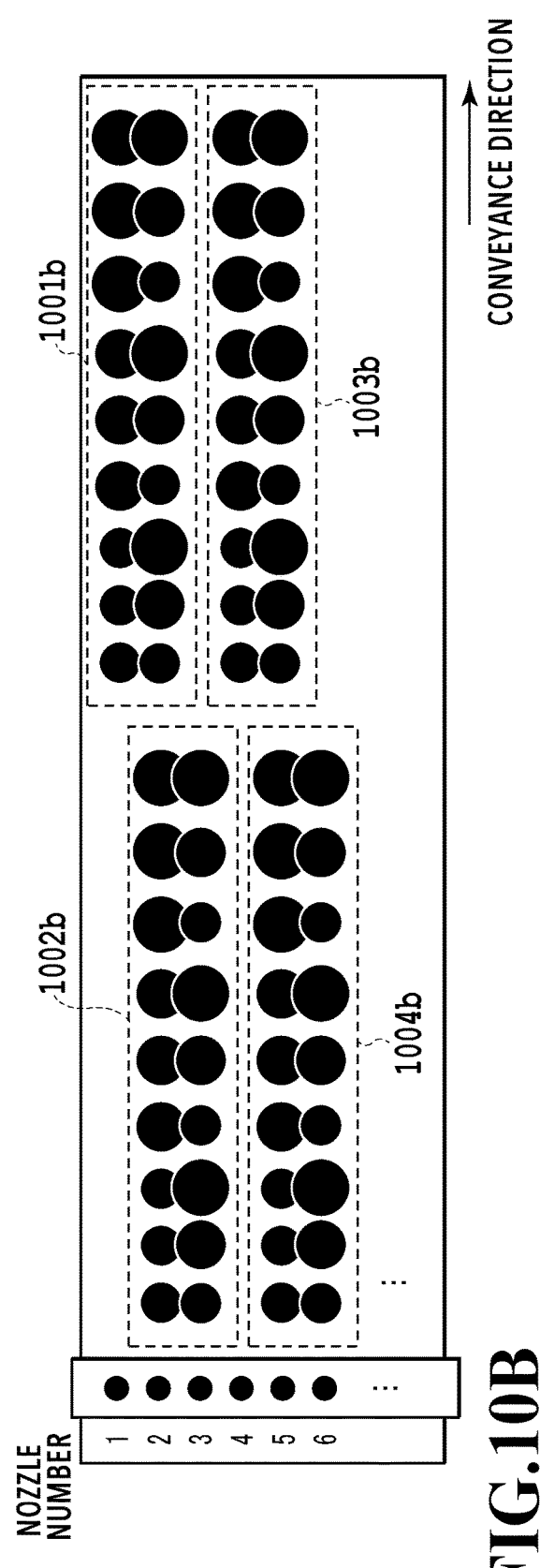
FIG. 10B is a diagram showing an example of a test pattern.

In the following, the test pattern and the contact determination are explained. In the following explanation, explanation of the portions (configurations) in common to those of the first embodiment is simplified or omitted. FIG. 10A and FIG. 10B are each a diagram showing an example of the test pattern.

In FIG. 10A, in an area 1001a, combinations of the dot pattern that can by ejected by the nozzle whose nozzle number is "1" and the dot pattern that can be ejected by the nozzle whose nozzle number is "2" are arranged. That is, for example, in a case where each nozzle can eject two kinds of dot, that is, the large dot and the small dot, a total of four patterns (small dot+small dot, large dot+small dot, small dot+large dot, large dot+large dot) are arranged in the area 1001a. Similarly, in a case where each nozzle can eject three kinds of dot, that is, the large dot, the medium dot, and the small dot, a total of nine patterns are arranged in an area 1001b as shown in the area 1001b in FIG. 10B. The nine patterns are small dot+small dot, small dot+medium dot, small dot+large dot, medium dot+small dot, medium dot+medium dot, medium dot+large dot, large dot+small dot, large dot+medium dot, and large dot+large dot.

Further, in an area 1002a (FIG. 10A) and an area 1002b (FIG. 10B), the dot patterns that can be ejected by the nozzles whose nozzle numbers are "2" and "3" are arranged as combinations thereof. Similarly, in an area 1003a and an area 1003b, the dot patterns that can be ejected by the nozzles whose nozzle numbers are "4" and "5" are arranged as combinations thereof and in an area 1004a and an area 1004, the dot patterns that can be ejected by the nozzles whose nozzle numbers are "5" and "6" are arranged as combinations thereof.

In order to improve the accuracy of dot pattern extraction, it is preferable to arrange each dot pattern combination sufficiently apart from another dot pattern combination. For example, in FIG. 10A, the area 1001a and the area 1003a are arranged at substantially the same conveyance position. However, in a case where the displacement amount or the dot diameter is so large that the dots ejected by the nozzles whose nozzle numbers are "2" and "4" contact, it is preferable to arrange the area 1004, not the area 1003a, at the same conveyance position as that of the area 1001a. Further, in this case, the area 1003a is arranged at the conveyance position (position to the left of the area 1002a in FIG. 10A) at which printing is performed after the area 1002a. In addition, in a case where the nozzle ejection state is taken into consideration, the patterns shown in FIG. 10A and FIG. 10B are repeatedly arranged by changing the dot combination and processing, to be described later, is performed for each conveyance position.

FIG. 11A to FIG. 11C are each a diagram showing an example of the nozzle characteristic. It is assumed that each nozzle can eject two kinds of dot, that is, the large dot and the small dot in the nozzle characteristic shown in FIG. 11A. As shown in FIG. 11A, for each "combination of nozzles", whether or not contact is possible for the "combination of dot sizes" is stored in the nozzle characteristic storage unit 110 as a table.

Specifically, for the combination whose dots contact, "○ (true)" is stored and for the combination whose dots do not contact, "x (false)" is stored. For example, in FIG. 11A, in a case where both the nozzles whose nozzle numbers are "1" and "2" eject the small dot and in a case where the nozzle whose nozzle number is "1" ejects the large dot and the nozzle whose nozzle number is "2" ejects the small dot, "x (false)" is stored. That is, it is indicated that in a case where dots are formed on the printing medium 202 with these combinations, the dots ejected from both the nozzles do not contact and a gap occurs between the dots.

As described above, in the present embodiment, it is possible to store data by a binary value (that is, "○ (true)" or "x (false)") in a table, and therefore, it is possible to reduce the memory size of the table smaller than the memory size of the table shown in FIG. 6A of the first embodiment. That is, in the present embodiment it is possible to reduce the memory capacity in a case where dot contact determination is performed.

In a case where the variation in the ejection amount for each nozzle is small and it is possible to regard the dot sizes as being substantially the same between each nozzle, it is possible to further reduce the memory capacity by regarding the combination of small dot+large dot and the combination of large dot+small dot as being the same pattern.

Further, it is possible to perform the dot contact determination in the dot size combination by, for example, a user checking the printed printing medium 202 by a visual inspection. Alternatively, it may also be possible to perform the dot contact determination based on the density information from the line sensor 205. That is, for example, as shown in FIG. 11B, the inflection point of the density is calculated and in a case where a difference ΔD between the local maximum and the local minimum is larger than a predetermined threshold value TH, it may be possible to determine that the dots not contact. Alternatively, based on a density Dmin at the inflection point at which the value of the density D is downward-convex, it may also be possible to determine that the dots do not contact in a case where the density Dmin is smaller than a predetermined threshold value TH'.

As a supplement, in a case where the presence/absence of contact of dots is stored as a table for each "combination of nozzles", by referring to the table at S805 in FIG. 8 described above, and in a case of "true", it may be possible to determine that the dots contact and in a case of "false", that dots do not contact. Further, in a case where determination results indicate that the dots do not contact ("false"), it is sufficient to select one combination whose dots contact ("true") and change the ejection pattern so that the combination is obtained.

Further, the nozzle characteristic in a case where each nozzle can eject three kinds of dot, that is, the large dot, the medium dot, and the small dot is shown in FIG. 11C. In FIG. 11C also, like FIG. 11A, whether or not contact is possible for the "combination of dot sizes" is stored in the nozzle characteristic storage unit 110 as a table for each "combination of nozzles".

Third Embodiment

In the above-described first and second embodiments, explanation is given on the assumption that dot rearrangement is performed based only on whether or not dot contact is possible between adjacent nozzles. However, in a case where the amount of the ink that is ejected is large, in a case where the nozzle integration density is high, or the like, there is a possibility that the dot that is ejected from the nozzle of interest and the dot that is ejected from a nozzle other than a nozzle adjacent to the nozzle of interest contact. For example, there is a case where the dot that is ejected from the nozzle whose nozzle number is "4" and the dot that is ejected from the nozzle whose nozzle number is "2" or "6" contact, which is adjacent to the nozzle whose nozzle number is "4" with one nozzle being located in between.

In the case such as this, it is possible to discuss to suppress streak unevenness by performing dot rearrangement so that the dot ejected from the nozzle of interest and the dot ejected from the nozzle adjacent to the nozzle of interest with one nozzle being located in between are caused to contact. For example, in a case where ink non-discharge occurs in the nozzle whose nozzle number is "3", it is possible to suppress streak unevenness by causing the dot ejected from the nozzle whose nozzle number is "4" and the dot ejected from the nozzle whose nozzle number is "6" to contact. As described above, there is a possibility that streak unevenness can be suppressed by taking into consideration the contact between the dot ejected from the nozzle of interest and the dot ejected from the nozzle other than the nozzle adjacent to the nozzle of interest.

It is also possible to calculate whether not contact is possible in this case from the dot diameter and the displacement amount as in the above-described first embodiment. For example, it is possible to determine whether or not contact is possible between the dot ejected from the nozzle whose nozzle number is "1" and the dot ejected from the nozzle whose nozzle number is "3" by determining whether or not $r1+r3 \geq \Delta y - \Delta y1 + \Delta y3$ is satisfied. As a supplement, in the above equation, r1 and r3 each indicate the radius of the dot ejected from each nozzle and $\Delta y1$ and $\Delta y3$ each indicate the displacement amount. Further, $\Delta y$ indicates the distance between the ejection target position of the nozzle whose nozzle number is "1" and the ejection target position of the nozzle whose nozzle number is "3" and for example, in a case where the print resolution in the nozzle row direction is 600 dpi, the distance is $2 \times 25.4/600 = 0.084$ [mm].

Figure 12:
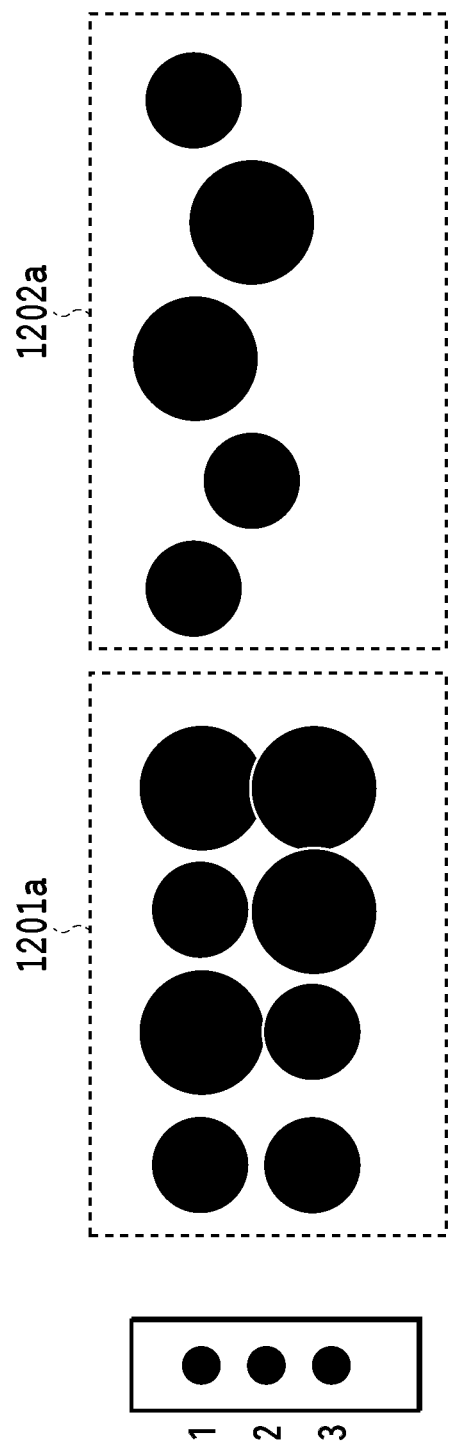
FIG. 12 is a diagram showing an example of a test pattern.

Further, as in the second embodiment, it may also be possible to print in advance the combinations of the target nozzle and all the dots as the test pattern and determine in advance contact or noncontact for each combination. For example, it may be possible to determine whether or not contact is possible by printing all the ejection patterns that can be ejected by the combination of the nozzles whose nozzle numbers are "1" and "3" as shown in an area 1201a in FIG. 12 and checking by a visual inspection or the like whether or not a gap occurs between those dots.

In addition, it may also be possible to store in advance whether or not contact is possible between a dot of interest (x, y) and a dot (x±1, y+1) or a dot (x±1, y−1), which is arranged in the oblique direction of the dot of interest (x, y). That is, specifically, it may also be possible to determine whether or not contact is possible by printing (outputting) the ejection patterns as shown in the area 1202a in FIG. 12. As described above, by taking into consideration also the dot ejected from the nozzle adjacent (nozzle apart more than one nozzle interval) to the nozzle of interest with one nozzle being located in between, it is made possible to cope with a case where there is a defective nozzle, such as an ink non-discharge nozzle.

Fourth Embodiment

In the above-described first to third embodiments, explanation is given on the assumption that the image forming apparatus 2 is a full-line ink jet printing apparatus. That is, in the above-described embodiments, as shown in FIG. 3, by using the printing apparatus comprising the print head that covers the entire area in the width direction of a printing medium, an image is formed by causing the print head to perform a scan relative to the printing medium.

On the other hand, a multi-pass method is known which forms an image by repeating the operation to cause the print head to perform a scan (main scan) in the direction perpendicular to the nozzle row without conveying a printing medium and to convey the printing medium by a conveyance amount less than or equal to the length of the nozzle group in the sub scanning direction substantially perpendicular to the main scanning direction.

FIG. 13A to FIG. 13C are each a diagram for explaining the printing operation in a multi-pass ink jet printing apparatus. FIG. 13A to FIG. 13C each show the two-pass printing operation to print an image by causing the print head 201 to perform a scan twice on the same line of the printing medium 202.

In a case of two-pass printing, for example, an image is printed by an amount corresponding to a width L of the print head by the main scan by carriage and each time printing of one line is completed, the printing medium 202 is conveyed by a distance of L/2 each time in the sub scanning direction. Specifically, an area A is printed by the mth main scan (FIG. 13A) and the (m+1)th main scan (FIG. 13B) of the print head and an area B is printed by the (m+1)th main scan (FIG. 13B) and the (m+2)th main scan (FIG. 13C) of the print head. Similarly, in a case where n-pass printing is performed, for example, each time printing of one line is completed, the printing medium 202 is conveyed by a distance of L/n each time in the sub scanning direction. In this case, an image is formed (printed) by causing the print head 201 to perform the scan nth times on the same line of the printing medium 202.

It is known that in a case where the multi-pass ink jet printing apparatus such as this is used, the same area is printed by different nozzles, and therefore, streak unevenness due to the position shift and the error of the dot diameter for each nozzle is reduced. However, in a case where the number of scans for the same area is small, in a case where the distribution of the number of dots ejected for each scan is uneven, in a case where dispersity of the pattern for each scan is low, or the like, there is a possibility that streak unevenness is still recognized visually.

In the present embodiment, as described above, the same area is printed by different nozzles, and therefore, a nozzle that performs ejection is specified and the characteristic of the nozzle is applied in a case where dot contact determination is performed.

Fifth Embodiment

As described above, in a case where many gaps between dots occur between the same nozzles, these gaps are visually recognized as streak unevenness on printed matter, but in a case where a gap occurs between dots that are not adjacent (between isolated dots), there is a possibility that the gap is unlikely to be recognized as streak unevenness.

Because of this, it may also be possible not to perform stochastically the dot size change processing at S807 in FIG. 8 described above in accordance with the degree in which streak unevenness is likely to be conspicuous. That is, in a case where the possibility that the dots are isolated dots is strong, even though a gap occurs between dots that are not adjacent, it may be possible to determine that the gap is unlikely to be visually recognized as streak unevenness and perform the dot size change processing with a low probability. For example, the number of peripheral dots is calculated and the larger the number is, the lower the probability of the dot size change processing may be set. Alternatively, the lower the pixel value of the dot of interest is, the lower the probability of the dot size change processing may be set.

Sixth Embodiment

In the above-described embodiment (FIG. 8), the example is explained in which in a case where there are dots at the adjacent image positions, on a condition that the dots do not contact and the dot size can be changed, the dot size is changed irrespective of the combination of the dots.

In the present embodiment, in a case where there are dots at the adjacent image positions, the processing to change the dot size is suppressed for the dot combination whose contact state does not change irrespective of the displacement of the landing position. In other words, in a case where there are dots at the adjacent image positions, on a condition that the dots contact in an ideal state and the dots no longer contact due to the displacement of the landing position, change processing is performed for the dot combination.

Specifically, in the ideal state in FIG. 9A described above, the dots 902 and 904 are in contact, but in a case where the landing position is displaced, there is a possibility that the dots 902' and 904' contact no longer as shown in FIG. 9B, and in the case such as this, dot combination change processing is performed.

Here, for example, in a case where the amount of ink that is ejected is small and the distance between dots is sufficiently large relative to the dot diameter, there is a possibility that a gap occurs between the dots even though there is no displacement (variation) in the ejection of ink originally. That is, there is a case where the range indicated by symbol 902 and the range indicated by symbol 904 do not contact irrespective of nozzles in FIG. 9A. In the case such as this, it may also be possible to skip the dot size contact determination shown at S805 and the dot size change processing shown at S807 in FIG. 8.

Further, for example, in a case where the amount of ink that is ejected is large relative to the variation (displacement) of ink ejection and the distance between dots is sufficiently small relative to the dot diameter, within the range of supposed displacement (variation), there is a possibility that non gap occurs between dots irrespective of displacement. That is, in FIG. 9B, in a case where the distance between the range indicated by symbol 902' and the range indicated by symbol 904' is sufficiently smaller than the range indicated by symbol 904', even though there is displacement in ink ejection, there is a possibility that the dots contact. In the case such as this, it may also be possible to cause the processing to advance to S808 without causing the processing to return from S807 to S805.

Figure 14A:
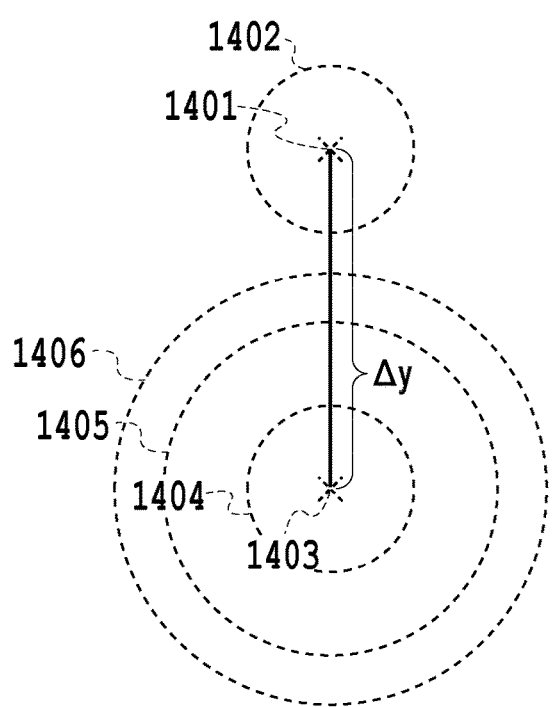
FIG. 14A is a diagram for explaining noncontact of dots.
Figure 14B:
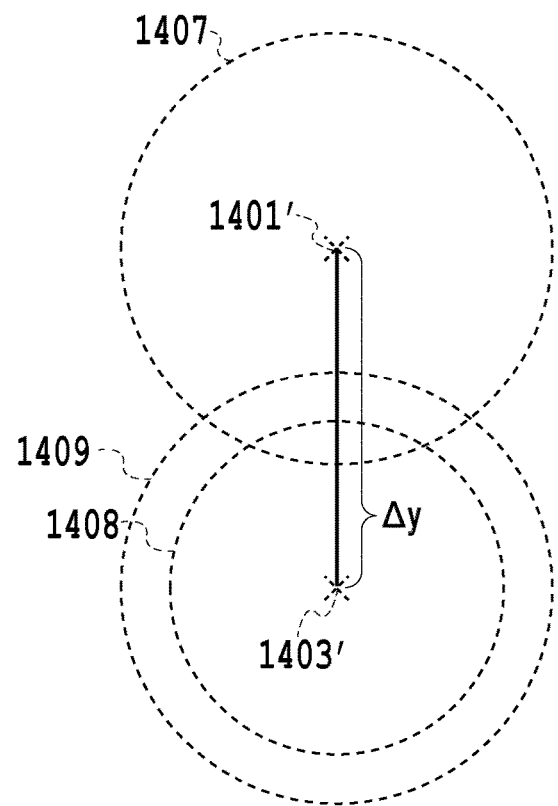
FIG. 14B is a diagram for explaining contact of dots.

In the following, by using FIG. 14A, FIG. 14B, and FIG. 15, specific processing of the image processing apparatus according to the present embodiment is explained. FIG. 14A and FIG. 14B are diagrams for explaining dot displacement and contact. FIG. 14A is a diagram schematically showing an example in which dots do not contact even in a case where ink ejection is not displaced (varied).

In FIG. 14A, symbol 1402 indicates a range to which ink is predicted to stick in a case where the small dot is ejected to an ejection target position 1401 by the nozzle whose nozzle number is "X". Further, symbol 1404 indicates a range to which ink is predicted to stick in a case where the small dot is ejected to an ejection target position 1403 by the nozzle whose nozzle number is "X+1". Similarly, symbol 1405 indicates a range that is predicted in a case where the medium dot is ejected by the nozzle whose nozzle number is "X+1" and symbol 1406 indicates a range that is predicted in a case where the large dot is ejected by the nozzle whose nozzle number is "X+1", respectively.

Here, as shown in FIG. 14A, relative to a distance $\Delta y$ between the ejection target positions 1401 and 1403, the ink sticking predicted range by the small dot is sufficiently small, and therefore, a gap occurs between dots even though the small dot is combined with any of the small, medium, and large dots. Further, in a case where the gap between dots is larger than the displacement amount $\Delta y1$ in the y-direction of the nozzle whose nozzle number is "X", not shown schematically, and the displacement amount $\Delta y2$ in the y-direction of the nozzle whose nozzle number is "X+1", even though the ink ejection is not displaced, it is possible to regard the dots as not contacting.

In the case such as this, as described above, for the combination including the small dot in the relevant nozzle, it may also be possible not to perform the dot size contact determination processing shown at S805 and the dot size change processing shown at S807 in FIG. 8. Further, in a case where it is possible to regard a gap as occurring between the small dot and any of the dot sizes in all the nozzles, for the combinations including the small dot in all the nozzles, it may also be possible not to perform the dot size contact determination and change processing. In addition, for another reason, for example, in a case where the possibility that the droplet lands in a state where the droplet is divided and largely separated into the main droplet and the sub droplet is strong in the small dot ejection and the accuracy of the contact determination is insufficient, for the combination including the small dot, it may also be possible not to perform the dot size contact determination and change processing.

Next, by using FIG. 14B, a case is explained where dots contact each other irrespective of variation (displacement) in ink ejection. FIG. 14B is a diagram schematically showing an example in which dots contact even in a case where ink ejection is varied (displaced) on a condition that the dot is sufficiently large.

In FIG. 14B, symbol 1407 indicates a range to which ink is predicted to stick in a case where the large dot is ejected to an ejection target position 1401' by the nozzle whose nozzle number is "X". Further, symbol 1408 indicates a range to which ink is predicted to stick in a case where the medium dot is ejected to the ejection target position 1403 by the nozzle whose nozzle number is "X+1". Similarly, symbol 1409 indicates a range that is predicted in a case where the large dot is ejected by the nozzle whose nozzle number is "X+1".

Here, as shown in FIG. 14B, relative to a distance $\Delta y$ between the ejection target position 1401' and an ejection target position 1403', the ink sticking predicted range is sufficiently large, and therefore, no gap occurs between dots even though the dot is combined with any of the medium and large dots. Further, in a case where the overlap of dots is larger than the displacement amount $\Delta y1$ in the y-direction of the nozzle whose nozzle number is "X", not shown schematically, and the displacement amount $\Delta y2$ in the y-direction of the nozzle whose nozzle number is "X+1", even though the ink ejection is displaced, it is possible to regard the dots as contacting.

In the case such as this, for the combination including the large dot but not including the small dot in the relevant nozzle, it may also be possible not to perform the dot size contact determination shown at S805 and the dot size change processing shown at S807 in FIG. 8. Further, in a case where it is possible to regard no gap as occurring for the combination including the large dot but not including the small dot in all the nozzles, it may also be possible not to perform the contact determination and the change processing for the combination including the large dot but not including the small dot in all the nozzles.

Here, both the states in FIG. 14A and FIG. 14B are assumed to be not the target of the dot combination change. That is, a case where the small dot is sufficiently small for the variation in the dot landing position and in the diameter of the dot formed on the surface of paper and there is no possibility that the small and medium dots contact and the small and large dots contact and a case where the large dot is sufficiently large and it is possible to regard the large and large dots and the large and medium dots as substantially contacting are taken not to be the target of the dot combination change. In the case such as this, it may be possible to search for the combination of the medium dot diameters and replace the combination with the combination of the large dot diameter and the medium dot diameter in a case where the dots do not contact.

Figure 15:
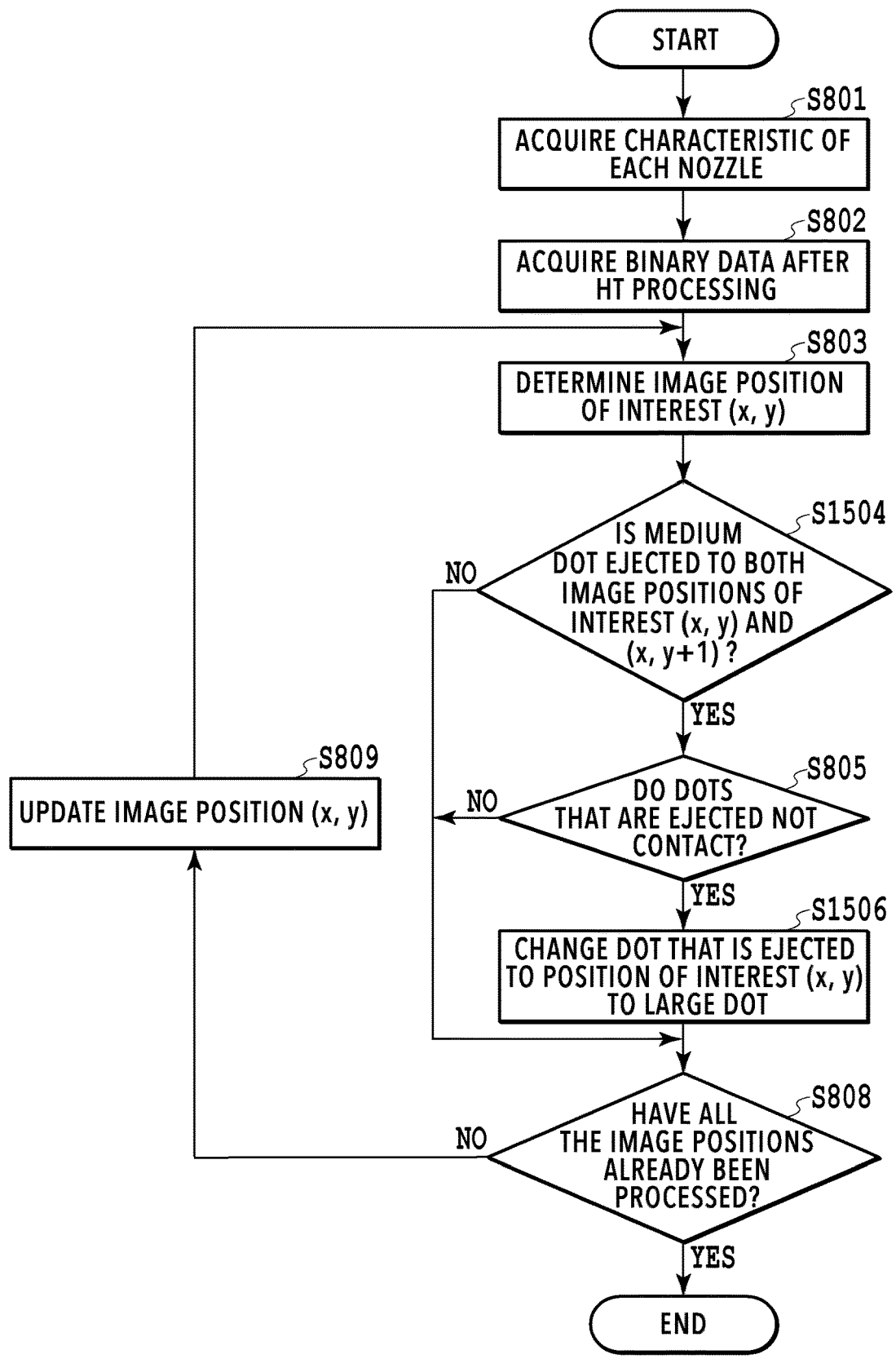
FIG. 15 is a flowchart showing a procedure of processing to search for a combination of dots whose dot diameter is medium.

As a supplement, by using the flowchart in FIG. 15, the procedure of the processing to search for the combination of the medium dot diameters is explained. The processing shown in the flowchart in FIG. 15 is substantially the same as the procedure of the processing shown in the flowchart in FIG. 8 and here, processing different from the flowchart in FIG. 8 is explained. Specifically, S804 is changed to S1504 and S805 is changed to S1505 and in the following, these pieces of processing are explained.

At S1504, the dot arrangement change unit 108 determines whether or not the medium dot is ejected to (arranged at) both the image positions of interest (x, y) and (x, y+1). In a case of determining that the medium dot is ejected to both the image positions of interest (x, y) and (x, y+1) (Yes at S1504), the dot arrangement change unit 108 causes the processing to advance to S805. Further, in a case of determining that the medium dot is not ejected to both the image positions of interest (x, y) and (x, y+1) (No at S1504), the dot arrangement change unit 108 causes the processing to advance to S808.

Furthermore, in a case where the processing is caused to advance to S805 and it is determined that the dots ejected to the image positions of interest (x, y) and (x, y+1) do not contact, at S1506, the dot size of the dot ejected to the image position of interest (x, y) or (x, y+1) is changed to that of the large dot.

As explained above, in the image processing apparatus according to the present embodiment, the change processing of the dot combination whose contact state does not change irrespective of the displacement in the landing position is suppressed. Due to this, it is possible to expect that an ill effect, such as worsening of granularity, is suppressed while suppressing streak-shaped density unevenness from being visually recognized.

Seventh Embodiment

In the above-described first embodiment, explanation is given on the assumption that the dot arrangement change unit 108 stepwise changes the dot size of the dot to a larger dot size in the processing at S807 in FIG. 8. However, in a case where it is possible to acquire the width of a gap, it is also possible to directly change the dot size to a size with which the gap is expected to disappear in place of stepwise changing the dot size of the dot. By directly changing the dot size in this manner, it is possible reduce the number of times of change and suppress streak-shaped density unevenness in a shorter processing time.

Figure 16:
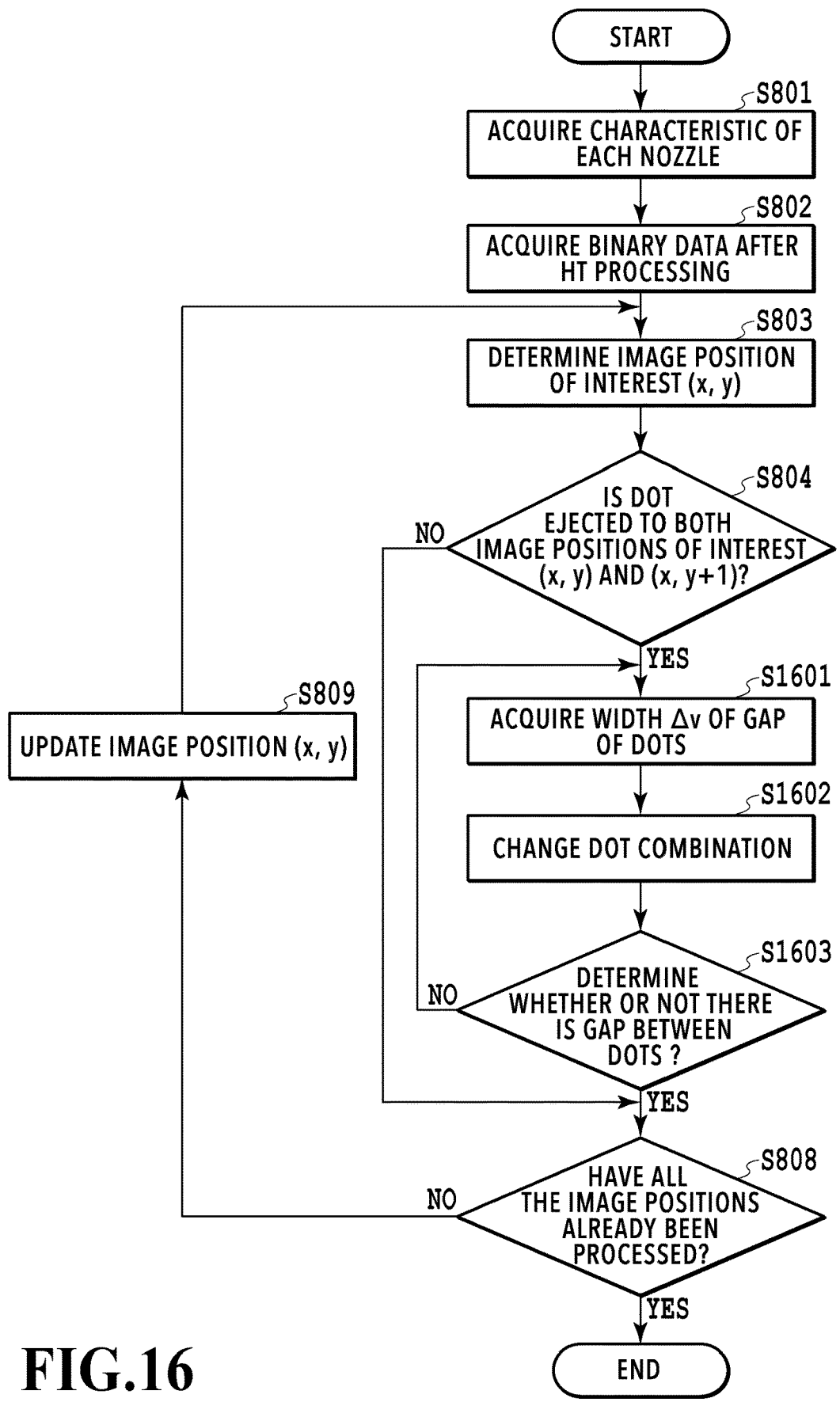
FIG. 16 is a flowchart showing a procedure of processing in the dot arrangement change unit.

In the following, by using the flowchart in FIG. 16, the procedure of the processing and the contents of the processing in the dot arrangement change unit 108 of the image processing apparatus 1 according to the present embodiment are explained. In explanation here, explanation of the portions (configurations) in common to those of the above-described first embodiment is simplified or omitted by using the same symbols.

Figure 17A:
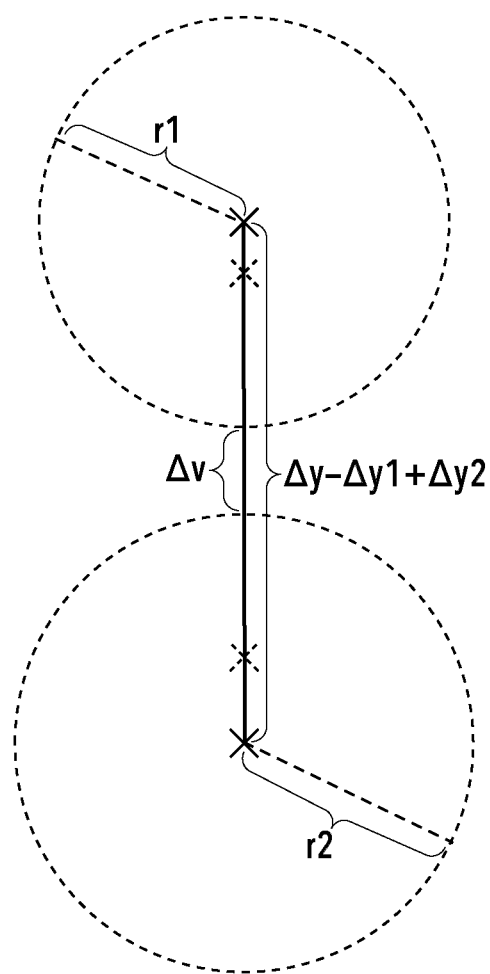
FIG. 17A is a diagram for explaining a width of a gap between dots.

In a case of determining that the dot is ejected to (arranged at) both the image positions of interest (x, y) and (x, y+1) at S804, the dot arrangement change unit 108 acquires the width of the gap of the dots ejected to the image positions of interest (x, y) and (x, y+1) at S1601. For example, as shown in FIG. 17A, a width $\Delta v$ of the gap of the dot ejected by the nozzle whose nozzle number is "X" and the dot ejected by the nozzle whose nozzle number is "X+1" is calculated by a mathematical equation $\Delta V = \Delta y - \Delta y1 + \Delta y2 - (r1+r2)$. That is, the dot arrangement change unit 108 acquires the width of the dots from a difference between the distance $\Delta y - \Delta y1 + \Delta y2$ between the centroids of the dot ejected by the nozzle whose nozzle number is "X" and the dot ejected by the nozzle whose nozzle number is "X+1" and the sum of the radius r1 and the radius r2 of the dots.

At S1602, the dot arrangement change unit 108 changes the dot combination based on the acquired width $\Delta v$ of the gap of the dots. However, in a case where the width $\Delta v$ of the gap of the dots is less than or equal to zero, the dot combination is not changed and the processing is caused to advance to S1603.

In a case where the width $\Delta v$ of the gap of the dots is larger than zero, the dot arrangement change unit 108 refers to the dot diameter of each dot from the nozzle characteristic shown in FIG. 6A and changes the combination to a combination by which the difference between the dot diameter before the change and the dot diameter after the change exceeds $\Delta v$.

Here, for example it is assumed that the nozzle characteristic of the nozzle No. X and the nozzle characteristic of the nozzle No. X+1 are the values shown in FIG. 18, the print resolution in the nozzle row direction is 600 dpi, and the distance $\Delta y$ between the ejection target positions is 25.4/600=42 [μm].

Figure 17B:
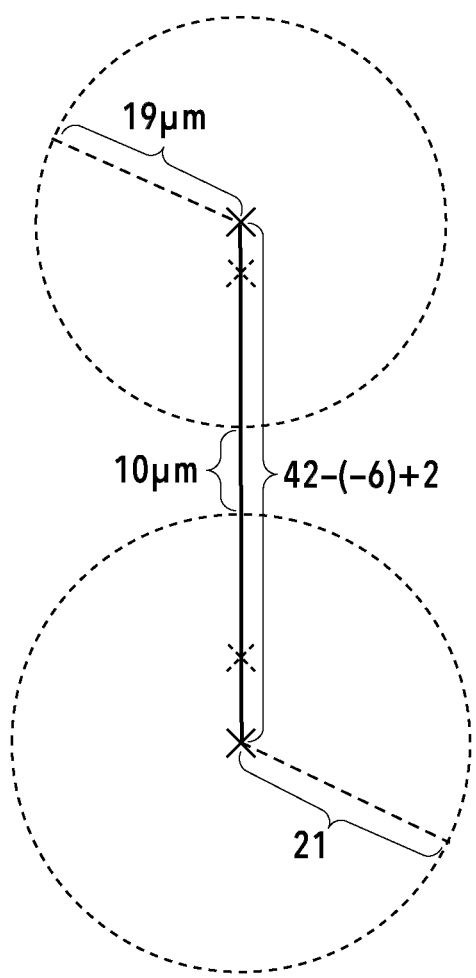
FIG. 17B is a diagram for explaining a width of a gap between dots.

In this case, on a condition that the small dot is ejected to the nozzle No. X and the small dot is ejected also to the nozzle No. X+1, the width of the gap between the dots is calculated as 42−(−6)+2−(19+21)=10 μm from FIG. 17B. Based on the calculated results, the dot arrangement change unit 108 focuses attention on the dot characteristic of the nozzle No. X and changes the dot of the nozzle No. X to the large dot that is a dot larger than the small dot by a 10 μm or more. Alternatively, it may also be possible for the dot arrangement change unit 108 to focus attention on the dot characteristic of the nozzle No. X+1 and change the dot of the nozzle No. X+1 to the large dot. Further, it may also be possible to perform the change so that the sum of the amounts of increase in the dot diameter exceeds 10 μm, which is the width of the gap, by changing both the dots of the nozzle No. X and the nozzle No. X+1 to the medium dots.

Returning to FIG. 16, at S1603, the dot arrangement change unit 108 determines whether or not there is a gap between dots in the dot combination after the change. Specifically, like S805, the dot arrangement change unit 108 determines contact of dots based on the dot diameter and the displacement amount. In a case of determining that dots contact (Yes at S1603), the dot arrangement change unit 108 causes the processing to S808 and in a case of determining that dots do not contact (No at S1603), causes the processing to S1601.

As explained above, by changing the dot combination so that the amount of increase in the dot diameter exceeds at least the width $\Delta v$ of the gap of the dots, it is possible to change the dot combination to a combination with no gap by the number of times of loop smaller than that in a case where the dot diameter is increased stepwise.

In the processing at S1602 described above, the nozzle combination is changed by using the nozzle characteristic shown in FIG. 8 (that is, the diameters and displacements of the large, medium, and small dots of each nozzle), but it may also be possible to use an average as the nozzle characteristic. For example, it may also be possible to calculate the average of the diameter of the large dot and the average of the displacement as the nozzle characteristic of the large dot and use them. Further, in a case where it is obvious that the gap between dots is eliminated by changing the dot combination at S1602, it may also be possible to omit the determination at S1603.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to appropriately reduce streak-shaped density unevenness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-226552, filed Dec. 3, 2018, and No. 2019-181457, filed Oct. 1, 2019, which are hereby incorporated by reference wherein in their entirety.

What is claimed is:

1. An image processing apparatus comprising:
an image data acquisition unit configured to acquire image data;
a generation unit configured to generate an ejection pattern of ink droplets from the image data, which are ejected for forming dots from a plurality of nozzles of an image forming apparatus;
a characteristic acquisition unit configured to acquire an ejection characteristic of ink droplets of the image forming apparatus; and
a pattern change processing unit configured to change the ejection pattern based on the ejection characteristic and the ejection pattern, wherein
the pattern change processing unit repeatedly performs, in a case where a gap occurs between dots that should be formed so as to contact each other by the image forming apparatus, the ejection pattern change until the gap is eliminated.

2. The image processing apparatus according to claim 1, wherein
the pattern change processing unit:
has a specification unit configured to specify a dot forming the gap in the ejection pattern; and
changes a size of the specified dot forming the gap.

3. The image processing apparatus according to claim 2, wherein
the pattern change processing unit:
further has a determination unit configured to determine whether or not it is possible to change a dot size of the specified dot forming the gap to a larger dot size; and
in a case of determining that it is possible to change the dot size to a larger dot size, changes the ejection pattern for the specified dot forming the gap.

4. The image processing apparatus according to claim 2, wherein
the pattern change processing unit preferentially selects a dot whose dot size is smaller from among the dots forming the gap and changes the ejection pattern so as to increase the dot size of the selected dot.

5. The image processing apparatus according to claim 2, wherein
the ejection characteristic includes a width of a dot formed by an ink droplet ejected from each of the plurality of nozzles and a shift amount of a formation position of the dot and
the specification unit specifies the dot forming the gap from the ejection characteristic and the ejection pattern.

6. The image processing apparatus according to claim 5, wherein
the specification unit specifies the dot forming the gap by using the widths and the shift amounts of the dots in a nozzle of interest and a nozzle adjacent to the nozzle of interest, or in the nozzle of interest and a nozzle adjacent to the nozzle of interest with one nozzle being interposed in between.

7. The image processing apparatus according to claim 6, wherein
the plurality of nozzles includes a first nozzle and a second nozzle and
the specification unit specifies the dot forming the gap based on whether or not
a radius r1 of a first dot formed by an ink droplet ejected from the first nozzle,
a radius r2 of a second dot formed by an ink droplet ejected from the second nozzle,
a displacement amount $\Delta y1$ in a direction perpendicular to a conveyance direction of a printing medium of the first dot,
a displacement amount $\Delta y2$ in a direction perpendicular to a conveyance direction of a printing medium of the second dot, and
a distance $\Delta y$ between an ejection target position of an ink droplet ejected from the first nozzle and an ejection target position of an ink droplet ejected from the second nozzle satisfy a relationship of r1+r2≥Δy−Δy1+Δy2.

8. The image processing apparatus according to claim 2, wherein
the ejection characteristic includes information relating to contact or noncontact for each combination of dot sizes in a nozzle of interest and a nozzle adjacent to the nozzle of interest or in the nozzle of interest and a nozzle adjacent to the nozzle of interest with one nozzle being interposed in between of the image forming apparatus and
the specification unit specifies the dot forming the gap from the ejection characteristic and the ejection pattern.

9. The image processing apparatus according to claim 2, wherein
the specification unit stores information indicating a dot size combination that forms a gap of two adjacent dots for each nozzle combination.

10. The image processing apparatus according to claim 9, wherein
the information is a table indicating presence/absence of dot contact for each dot size combination.

11. The image processing apparatus according to claim 1, wherein
the ejection characteristic controls a probability with which the ejection pattern is changed in accordance with at least one of a dot density and a pixel value.

12. The image processing apparatus according to claim 1, wherein
the characteristic acquisition unit acquires an ejection characteristic of ink droplets of the image forming apparatus for each predetermined number of times of printing or for each continuous print time in a nozzle of the image forming apparatus.

13. The image processing apparatus according to claim 1, wherein
the characteristic acquisition unit acquires an ejection characteristic of ink droplets of a full-line image forming apparatus comprising a print head covering an entire area in a width direction of a printing medium as the ejection characteristic of ink droplets.

14. The image processing apparatus according to claim 1, wherein
each of the plurality of nozzles is a nozzle capable of ejecting dots of different sizes.

15. The image processing apparatus according to claim 1, wherein
the generation unit generates the ejection pattern by separating the image data into image data for each dot size and performing halftone processing for each piece of image data for each dot size.

16. The image processing apparatus according to claim 1, wherein
the pattern change processing unit increases, in a case where a gap occurs between dots that should be formed so as to contact each other by the image forming apparatus and sizes of both dots that should be formed so as to contact each other by the image forming apparatus can be changed to larger sizes, a size of one of dots that should be formed so as to contact each other by the image forming apparatus.

17. The image processing apparatus according to claim 1, wherein
the pattern change processing unit increases, in a case where a gap occurs between dots that should be formed so as to contact each other by the image forming apparatus and sizes of both dots that should be formed so as to contact each other by the image forming apparatus can be changed to larger sizes, a size of a dot whose dot size is smaller of dots that should be formed so as to contact each other by the image forming apparatus.

18. The image processing apparatus according to claim 1, wherein
dots that should be formed so as to contact each other by the image forming apparatus are two dots ejected by adjacent different nozzles in the ejection pattern.

19. A non-transitory computer readable storage medium storing a program for causing a computer to function as an image processing apparatus, wherein
the image processing apparatus comprises:
an image data acquisition unit configured to acquire image data;
a generation unit configured to generate an ejection pattern of ink droplets from the image data, which are ejected for forming dots from a plurality of nozzles of an image forming apparatus;
a characteristic acquisition unit configured to acquire an ejection characteristic of ink droplets of the image forming apparatus; and
a pattern change processing unit configured to change the ejection pattern based on the ejection characteristic and the ejection pattern, wherein
the pattern change processing unit repeatedly performs, in a case where a gap occurs between dots that should be formed so as to contact each other by the image forming apparatus, the ejection pattern change until the gap is eliminated.

20. An image processing method in an image processing apparatus, the image processing method comprising:
an image data acquisition step of acquiring image data;
a generation step of generating an ejection pattern of ink droplets from the image data, which are ejected for forming dots from a plurality of nozzles of an image forming apparatus;
a characteristic acquisition step of acquiring an ejection characteristic of ink droplets of the image forming apparatus; and
a pattern change processing step of changing the ejection pattern based on the ejection characteristic and the ejection pattern, wherein
in a case where a gap occurs between dots that should be formed so as to contact each other by the image forming apparatus, the pattern change processing step is performed repeatedly until the gap is eliminated.

* * * * *